(12) United States Patent
Konno

(10) Patent No.: US 11,079,131 B2
(45) Date of Patent: Aug. 3, 2021

(54) CONTROL METHOD, CONTROL APPARATUS, AND NON-TRANSITORY COMPUTER-READABLE STORAGE MEDIUM FOR STORING PROGRAM PERFORMED BY COMPUTER

(71) Applicant: FUJITSU LIMITED, Kanagawa (JP)

(72) Inventor: Takeshi Konno, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 52 days.

(21) Appl. No.: 16/595,554

(22) Filed: Oct. 8, 2019

(65) Prior Publication Data
US 2020/0124304 A1 Apr. 23, 2020

(30) Foreign Application Priority Data
Oct. 23, 2018 (JP) .............................. JP2018-199239

(51) Int. Cl.
| | |
|---|---|
| *F24F 11/30* | (2018.01) |
| *F24F 11/56* | (2018.01) |
| *F24F 11/61* | (2018.01) |
| *F24F 11/64* | (2018.01) |
| *F24F 11/65* | (2018.01) |

(Continued)

(52) U.S. Cl.
CPC .............. *F24F 11/30* (2018.01); *F24F 11/56* (2018.01); *F24F 11/61* (2018.01); *F24F 11/64* (2018.01); *F24F 11/65* (2018.01); *G05B 19/042* (2013.01); *F24F 2110/10* (2018.01); *F24F 2110/12* (2018.01); *G05B 2219/2614* (2013.01)

(58) Field of Classification Search
CPC .. F24F 11/30; F24F 11/56; F24F 11/61; F24F 11/64; F24F 11/65; F24F 2110/10; F24F 2110/12; G05B 19/042; G05B 2219/2614; G05B 15/02
See application file for complete search history.

(56) References Cited

U.S. PATENT DOCUMENTS

| | | | | |
|---|---|---|---|---|
| 10,559,045 | B2 * | 2/2020 | Bentz | ..................... F24F 1/0003 |
| 10,584,892 | B2 * | 3/2020 | Sasaki | ...................... F24F 11/80 |

(Continued)

FOREIGN PATENT DOCUMENTS

JP 2013-190164 9/2013

*Primary Examiner* — Ramesh B Patel
(74) *Attorney, Agent, or Firm* — Fujitsu Patent Center

(57) ABSTRACT

A control method includes: executing a generation process of generating criterion information based on history information regarding an operation of an air-conditioning apparatus, the criterion information being information used for switching a mode of the air-conditioning apparatus between a first mode and a second mode, the first mode being configured not to take an influence of an outdoor temperature into consideration, the second mode being configured to take the influence of the outdoor temperature into consideration, the air-conditioning apparatus being configured to perform air-conditioning control in a space based on the outdoor temperature and a room temperature of the space; and executing a control process when the air-conditioning apparatus performs air-conditioning in the space, the control process including performing control for switching the mode of the air-conditioning apparatus to the first mode or the second mode based on the outdoor temperature, the room temperature, and the criterion information.

12 Claims, 17 Drawing Sheets

(51) Int. Cl.
*G05B 19/042* (2006.01)
*F24F 110/10* (2018.01)
*F24F 110/12* (2018.01)

(56) References Cited

U.S. PATENT DOCUMENTS

| | | | |
|---|---|---|---|
| 2012/0042672 A1* | 2/2012 | Fujihara | F24F 3/14 62/157 |
| 2016/0047566 A1* | 2/2016 | Haga | H04L 12/28 702/184 |
| 2016/0054018 A1* | 2/2016 | Motodani | F24F 11/56 700/276 |
| 2016/0359325 A1* | 12/2016 | Kawata | H02J 3/14 |
| 2019/0041080 A1* | 2/2019 | Higuchi | F24F 11/56 |
| 2019/0309970 A1* | 10/2019 | Park | F24F 11/30 |
| 2019/0369575 A1* | 12/2019 | Raina | F24F 11/65 |
| 2020/0124310 A1* | 4/2020 | Konno | F24F 11/64 |

* cited by examiner

FIG. 8
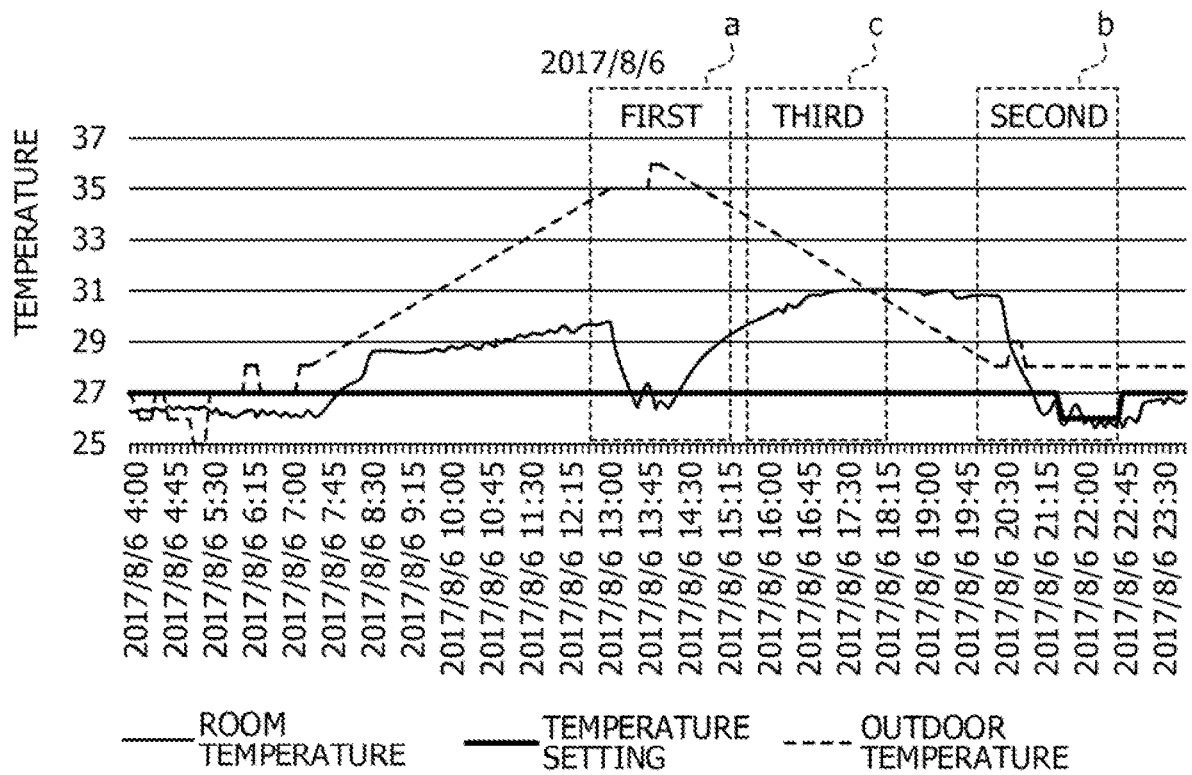
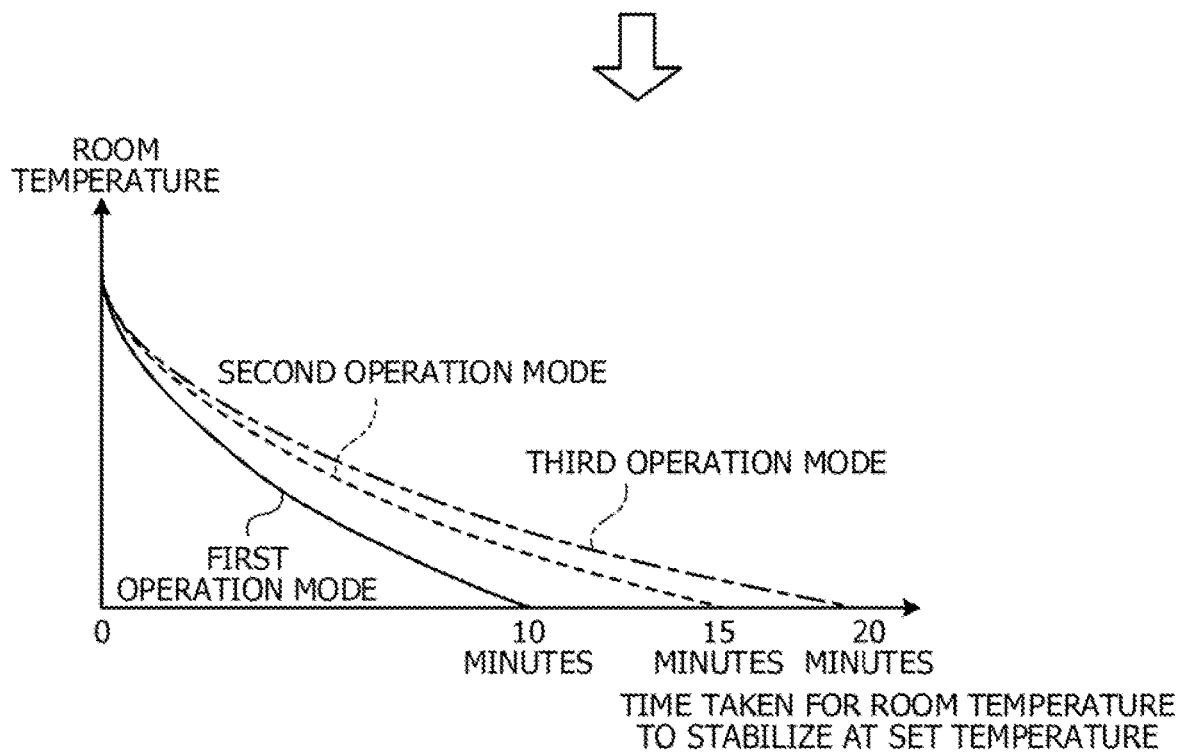

FIG. 13
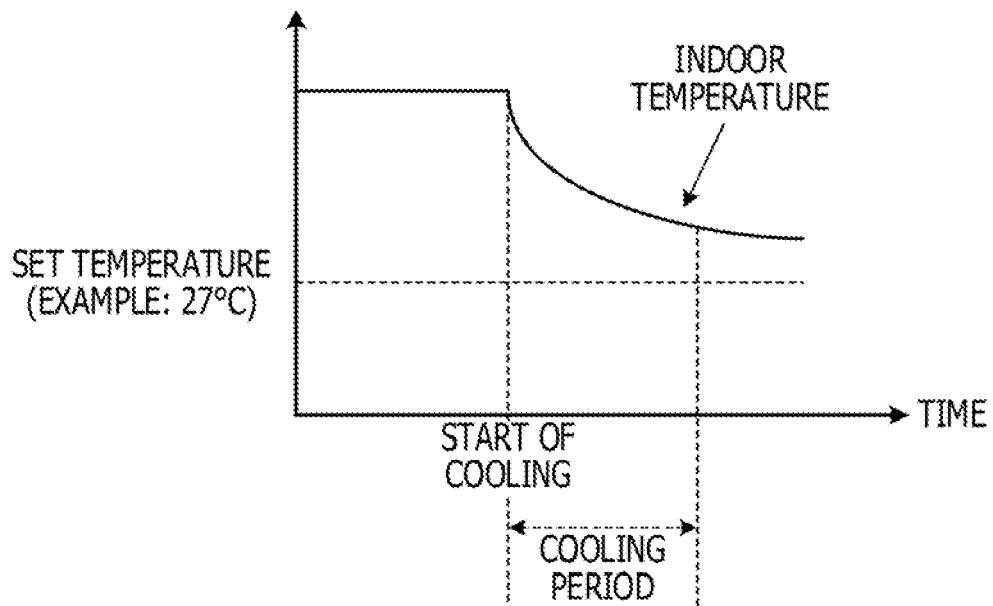
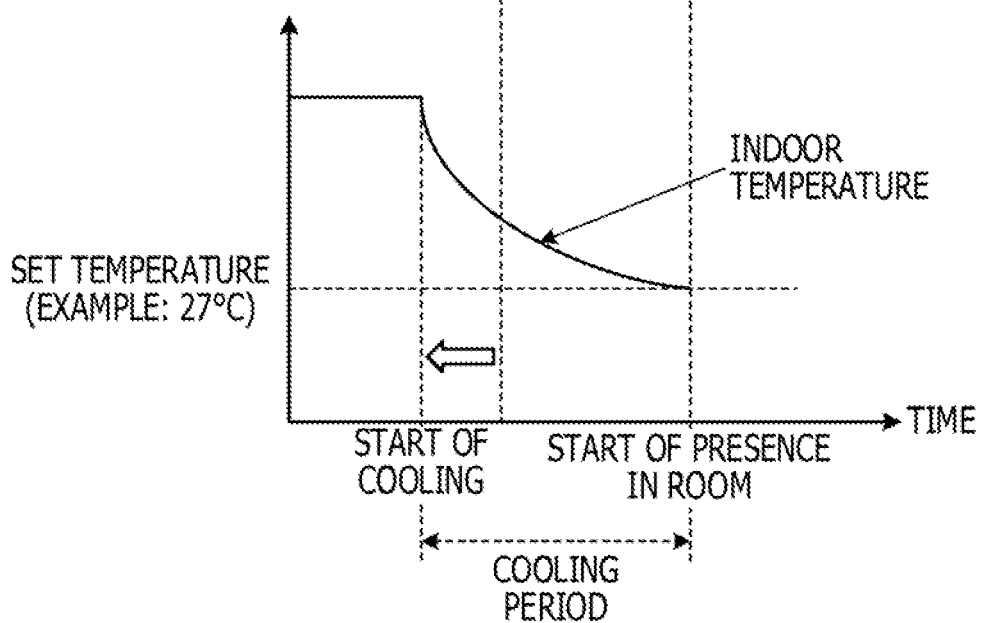

FIG. 14
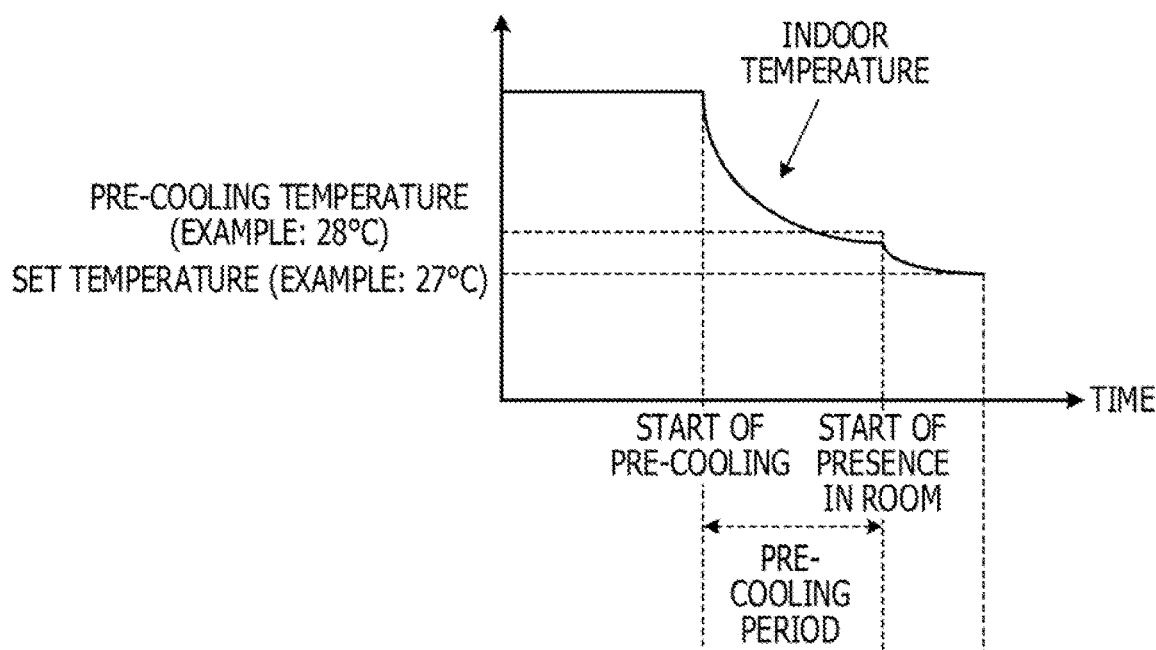
(a) COMMON METHOD
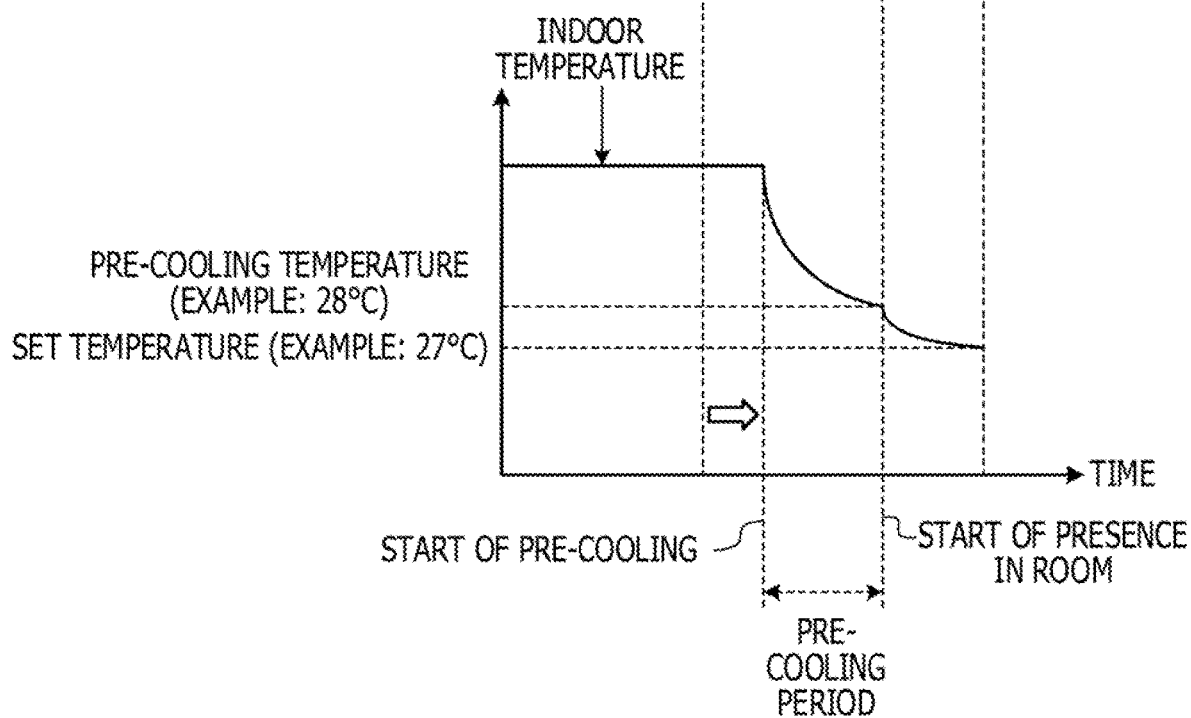
(b) METHOD ACCORDING TO FIRST EMBODIMENT

CONTROL METHOD, CONTROL APPARATUS, AND NON-TRANSITORY COMPUTER-READABLE STORAGE MEDIUM FOR STORING PROGRAM PERFORMED BY COMPUTER

CROSS-REFERENCE TO RELATED APPLICATION

This application is based upon and claims the benefit of priority of the prior Japanese Patent Application No. 2018-199239, filed on Oct. 23, 2018, the entire contents of which are incorporated herein by reference.

FIELD

The embodiments discussed herein are related to a control method, a control apparatus, and a non-transitory computer-readable storage medium storing a program.

BACKGROUND

As an operation method of an air-conditioning apparatus for heating and cooling a room, there is known a method of performing a pre-cooling operation or a pre-heating operation so that the indoor temperature reaches a target temperature by specified time in order to improve the comfort of a user and reduce the cost such as an electric bill due to a wasteful operation. In recent years, there has been known a technique for performing a pre-cooling operation or a pre-heating operation before set time on the assumption that the time at which a user is in a room is not necessarily the set time but varies and for performing a cooling operation or a heating operation toward a target temperature in response to detection of presence of the user in the room.

Examples of the related art include Japanese Laid-open Patent Publication No. 2013-190164.

SUMMARY

According to an aspect of the embodiments, a control method performed by a computer includes: executing a generation process that includes generating criterion information based on history information regarding an operation of an air-conditioning apparatus, the criterion information being information used for switching an operation mode of the air-conditioning apparatus between a first operation mode and a second operation mode, the first operation mode being configured not to take an influence of an outdoor temperature into consideration, the second operation mode being configured to take the influence of the outdoor temperature into consideration, the air-conditioning apparatus being configured to perform air-conditioning control in a space subjected to air-conditioning, based on the outdoor temperature and a room temperature of the space subjected to air-conditioning; and executing a control process when the air-conditioning apparatus performs air-conditioning in the space, the control process including performing control for switching the operation mode of the air-conditioning apparatus to the first operation mode or the second operation mode based on the outdoor temperature, the room temperature of the space, and the criterion information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram for describing operation modes;

FIG. 13 is a diagram for describing advantages of one-stage air-conditioning control;

FIG. 14 is a diagram for describing advantages of two-stage air conditioning control;

DESCRIPTION OF EMBODIMENTS

The temperature in a target room or the like varies greatly depending on a heat storage state at the time of the start of the operation. Consequently, a situation may occur in which the temperature reaches the target temperature before the specified time or the temperature does not reach the target temperature by the specified time. Accordingly, it is hard to say that appropriate air-conditioning control is performed with the technique described above.

In one aspect, it is an object to provide a control program, a control method, and a control apparatus that enable appropriate air-conditioning control to be performed.

Embodiments of a control program, a control method, and a control apparatus disclosed herein will be described in detail below with reference to the drawings. Note that these embodiments do not limit the present disclosure, Each of the embodiments may be appropriately combined with another embodiment within a scope without contradiction.

First Embodiment

Example of Overall Configuration

Figure 1:
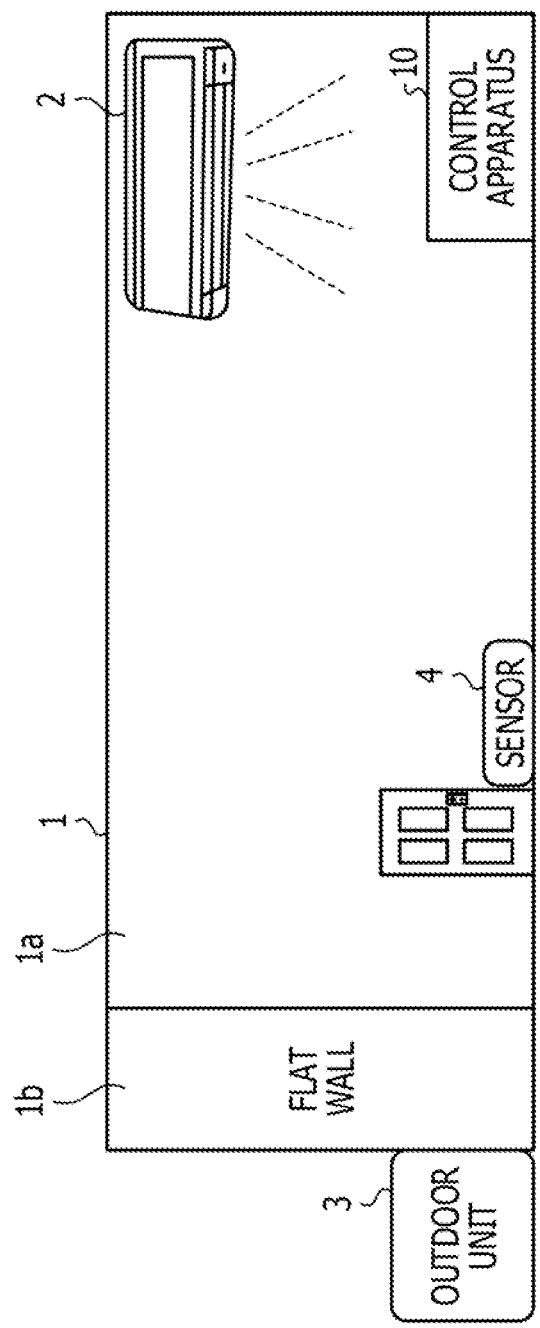
FIG. 1 is a diagram for describing an example of an overall configuration of a system according to a first embodiment.

FIG. 1 is a diagram for describing an example of an overall configuration of a system according to a first embodiment. As illustrated in FIG. 1, this system is a system including a control apparatus 10 and devices installed in a room 1 that is an example of a space subjected to air-conditioning control. The control apparatus 10 may be installed inside the room 1 or may be installed outside the room 1. A cloud system or the like may be used as the control apparatus 10, and the control apparatus 10 may be coupled via a network N to each of the devices installed in the room 1 subjected to air-conditioning control so as to be able to communicate with each other. Various wired or wireless communication networks such as the Internet may be adopted as the network N.

The room 1 includes a flat wall 1b, an air-conditioning apparatus 2, an outdoor unit 3, and a sensor 4. The flat wall 1b is an example of an outer wall for isolating an indoor space 1a from the outside. The air-conditioning apparatus 2 is installed in the indoor space 1a. The outdoor unit 3 is installed outside the room 1. The sensor 4 is installed in the indoor space 1a. The flat wall 1b is affected by an outdoor temperature and stores heat. The air-conditioning apparatus 2 is an air conditioner or the like for performing cooling or heating in the room 1. The air-conditioning apparatus 2 performs air-conditioning control in accordance with an instruction from the control apparatus 10. The outdoor unit 3 is an outdoor unit of the air-conditioning apparatus 2. The outdoor unit 3 includes a sensor that measures the outdoor temperature and collects an outdoor temperature history. The sensor 4 is a person sensor that detects whether a user is in the indoor space 1a. The sensor 4 collects a result indicating whether the user is detected, detection time, and so on.

The control apparatus 10 is an example of a torque control apparatus that manages the individual devices installed in the room 1 and performs air-conditioning control on the air-conditioning apparatus 2. The control apparatus 10 acquires the outdoor temperature history from the outdoor unit 3. The control apparatus 10 acquires information about the presence of the user in the room 1 (hereinafter, referred to as user presence information) including time at which the user started to be in the room 1 (hereinafter, referred to as presence start time) and time at which the user exited from the room 1 (hereinafter, referred to as exit time) from the sensor 4. The control apparatus 10 acquires history information or the like of the air-conditioning control performed in the indoor space 1a from the air-conditioning apparatus 2.

Common air-conditioning control will be described. In this embodiment, cooling will be described as an example. In the common air-conditioning control, the earliest presence start time identified from the user presence information of a user is set as specified time, and a pre-cooling operation is performed so that the indoor temperature reaches a target temperature by the specified time. However, a change in the temperature in the indoor space 1a greatly varies depending on a heat storage state of the flat wall 1b of the target room 1 at the time when the operation is started.

Figure 2:
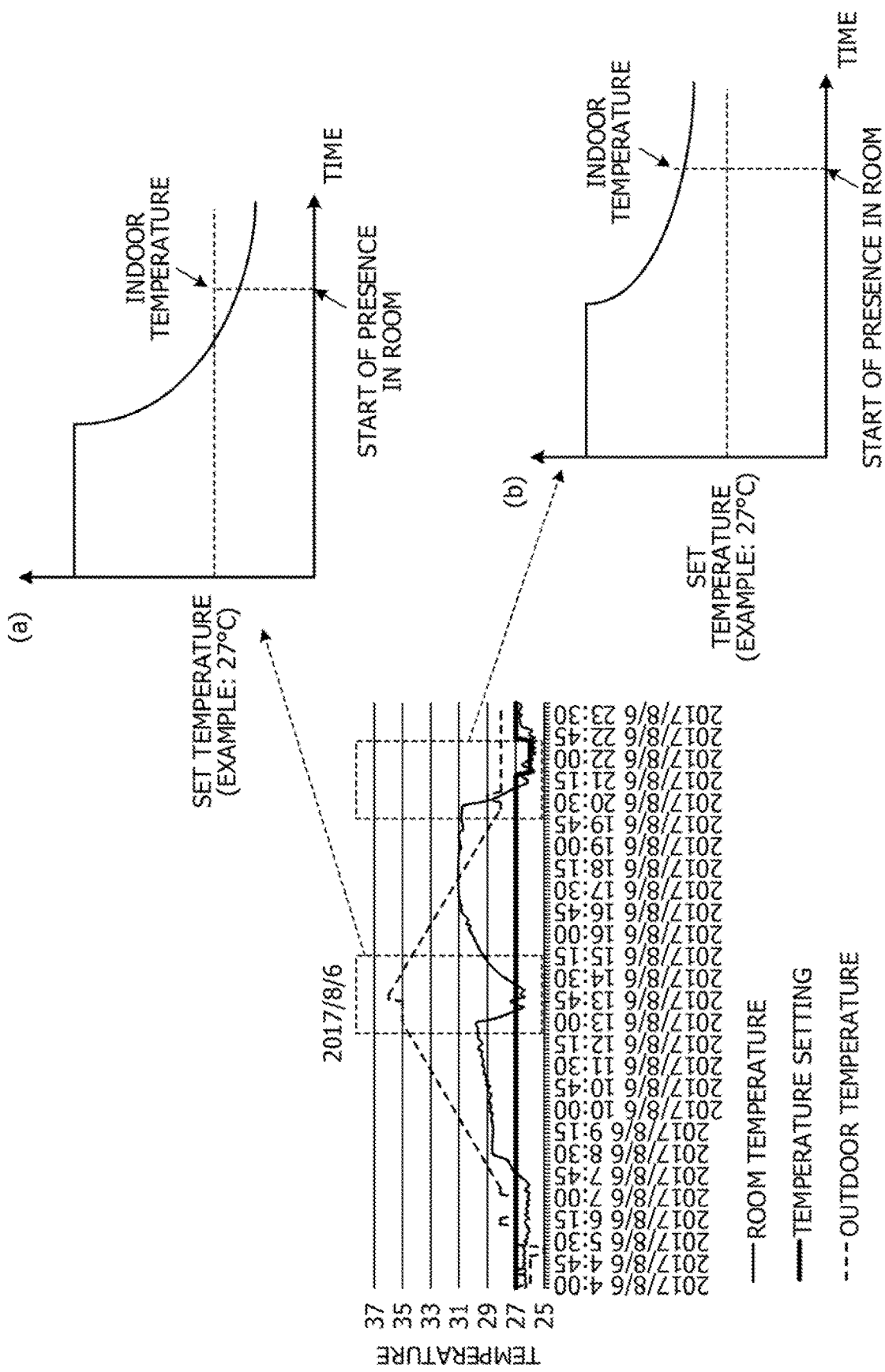
FIG. 2 is a diagram for describing an influence of heat storage.

FIG. 2 is a diagram for describing an influence of heat storage. FIG. 2 illustrates histories of a room temperature of a certain indoor space, an outdoor temperature, and a temperature setting. As illustrated in FIG. 2, since heat accumulated in an outer wall (corresponding to the flat wall 1b in FIG. 1) is dissipated during nighttime of the previous day, the outer wall is capable of storing heat in the morning. Thus, an increase in the room temperature is small although the outdoor temperature increases. For this reason, when the specified time is set to time in or around the morning, the room temperature may decrease too low before the user is in the room as illustrated in (a) of FIG. 2, because cooling is performed to the target temperature even though the increase in the room temperature is small.

Since the heat stored in the outer wall in the daytime is dissipated to the indoor space in the afternoon, the room temperature increases although the outdoor temperature decreases. Therefore, when the specified time is set to time at or after the evening time, the room temperature may not decrease sufficiently by the time when the user is in the room as illustrated in (b) of FIG. 2, because cooling is performed to the target temperature in a state where the room temperature has increased.

Accordingly, when the pre-cooling operation is performed by the specified time based only on the indoor temperature, the outdoor temperature, and the target temperature, a situation may occur where the room temperature reaches the target temperature before the specified time or the room temperature does not reach the target temperature by the specified time. Thus, the discomfort of the user is rather increased or an unnecessary electric bill is caused.

Accordingly, the control apparatus 10 according to the first embodiment generates criterion information based on the outdoor temperature, the room temperature of the room 1, and the history information about the operation of the air-conditioning apparatus 2. The criterion information is used for switching an operation mode between an operation mode in which an influence of the outdoor temperature is taken into consideration and an operation mode in which the influence of the outdoor temperature is not taken into consideration. The control apparatus 10 performs, when the air-conditioning apparatus 2 performs air conditioning in the room 1, control for switching an operation mode of the air-conditioning apparatus 2, based on the outdoor temperature, the room temperature of the room 1, and the criterion information.

For example, the control apparatus 10 generates a determination rule based on a relationship with the outdoor temperature and on whether there is an inflow of heat from the outside, as a criterion for determining the state of the space subjected to air-conditioning, and performs the air-conditioning control according to the determination result. In this way, the control apparatus 10 may perform appropriate operation control.

Functional Configuration

Figure 3:
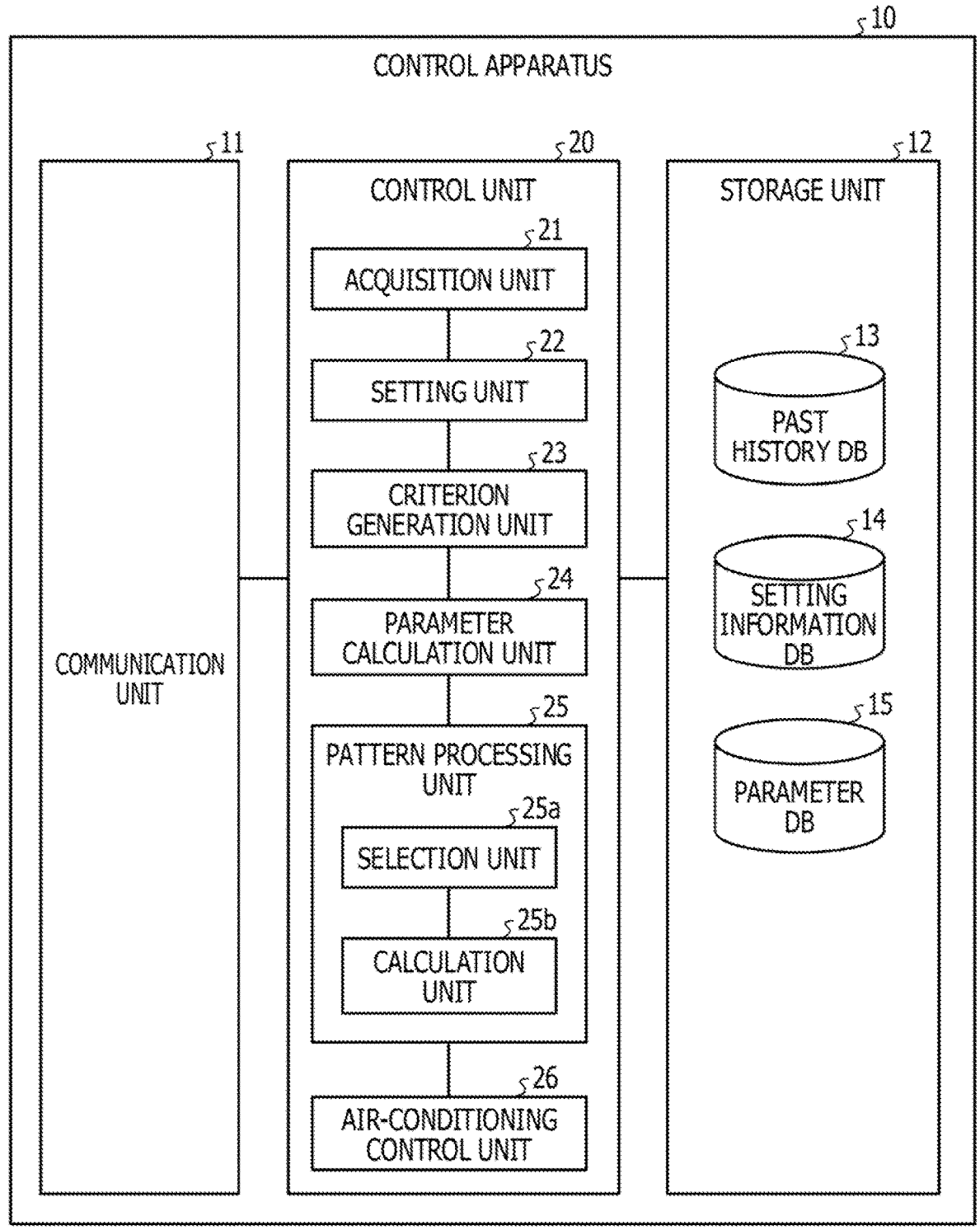
FIG. 3 is a functional block diagram illustrating a functional configuration of a control apparatus according to the first embodiment.

FIG. 3 is a functional block diagram illustrating a functional configuration of the control apparatus 10 according to the first embodiment. As illustrated in FIG. 3, the control apparatus 10 includes a communication unit 11, a storage unit 12, and a control unit 20. The communication unit 11 is a processing unit that controls communication with another apparatus. The communication unit 11 is, for example, a communication interface or the like. For example, the communication unit 11 performs transmission and reception of data to and from an administrator terminal and performs transmission and reception of data to and from the respective devices installed in the room 1.

The storage unit 12 is an example of a storage device that stores data and a program. The storage unit 12 is, for example, a memory, a hard disk, or the like. The storage unit 12 stores a past history database (DB) 13, a setting information DB 14, and a parameter DB 15.

The past history DB 13 is a database for storing history information regarding air-conditioning control. For example, the past history DB 13 stores various kinds of history information such as details of air-conditioning control performed by the air-conditioning apparatus 2, the room temperature measured by the air-conditioning apparatus 2, the outdoor temperature measured by the outdoor unit 3, and the user presence information of the user detected by the sensor 4. The kinds of information are each stored in the past history DB 13 in association with a date and time. Thus, the kinds of history information of the respective devices may be associated with each other.

The setting information DB 14 is a database for storing the target temperature and the specified time. For example, the target temperature may be arbitrarily set by the user or the like. The specified time is information specifying the time at which the room temperature reaches the target temperature. The specified time may be arbitrarily set by the user. Alternatively, the earliest presence start time, an average time of the presence start times, or the like may be set as the specified time from the past history.

The parameter DB 15 is a database for storing various parameters calculated by the control unit 20, various parameters set in advance, and so on. For example, the parameter DB 15 stores a that indicates thermal insulation performance of the room 1, β that indicates a relationship between a volume and a specific heat of air in the room 1, and σ(=αβ) that denotes a heat storage factor corresponding to the room 1.

The control unit 20 is a processing unit that manages the entire control apparatus 10 and is, for example, a processor or the like. The control unit 20 includes an acquisition unit 21, a setting unit 22, a criterion generation unit 23, a parameter calculation unit 24, a pattern processing unit 25, and an air-conditioning control unit 26. The acquisition unit 21, the setting unit 22, the criterion generation unit 23, the parameter calculation unit 24, the pattern processing unit 25, and the air-conditioning control unit 26 are examples of electronic circuits included in the processor or examples of processes executed by the processor.

The acquisition unit 21 is a processing unit that acquires various kinds of data from the individual devices in the room 1. For example, the acquisition unit 21 acquires the details of the air-conditioning control and the room temperature from the air-conditioning apparatus 2, acquires the outdoor temperature from the outdoor unit 3, and acquires the user presence information (whether or not the user is in the room 1 and the presence start time) from the sensor 4. The acquisition unit 21 stores the acquired information in the past history DB 13. The acquisition unit 21 may acquire the information periodically or may acquire the information when there is a change in the information to be acquired. Each of the devices may spontaneously transmit the corresponding information.

The setting unit 22 is a processing unit that sets the target temperature and the specified time. For example, the setting unit 22 sets a temperature accepted from the user as the target temperature and stores the target temperature in the setting information DB 14. The setting unit 22 may set the earliest presence start time as the specified time with reference to the past history DB 13 and store the specified time in the setting information DB 14. Alternatively, the setting unit 22 may calculate an average time of the presence start times of the respective days, set the average time as the specified time, and store the specified time in the setting information DB 14.

The criterion generation unit 2 is a processing unit that generates a determination criterion that is used for determining the operation mode and is based on the state of the space subjected to air-conditioning. For example, the criterion generation unit 23 generates a determination criterion based on a relationship between the outdoor temperature and the room temperature, whether there is a heat inflow from the outside to the indoor space, and so on.

For example, the criterion generation unit 23 refers to a history of the air-conditioning control in the past and specifies a relationship between an influence of heat dissipation from the outer wall to the indoor space and air-conditioning control performed by the air-conditioning apparatus 2. For example, in consideration of the above-described influence of heat dissipation from the outer wall to the indoor space, the criterion generation unit 23 may predict that a period taken for decreasing the room temperature of the room to be cooled to a target temperature (pre-cooling temperature) is shorter in a state where the room temperature is not affected by the rising outdoor temperature than that in a state where the room temperature is affected by the outdoor temperature. In other words, the criterion generation unit 23 may predict that the cooling period is shorter in a time period in which the outer wall is capable of storing heat. On the other hand, in the state where the room temperature is affected by the rising outdoor temperature, the criterion generation unit 23 may predict that the cooling period changes depending on the relationship between the room temperature and the outdoor temperature. In other words, the criterion generation unit 23 may predict that the cooling period becomes the longest when the current room temperature (room temperature at the time when the cooling period is calculated) is higher than the outdoor temperature in a time period in which the outer wall is no longer capable of storing heat and heat dissipation from the outer wall to the indoor space occurs.

Based on these predictions, the criterion generation unit 23 generates a determination criterion such that a first operation mode is selected when a change in the room temperature is affected by the outdoor temperature, a second operation mode is selected when the change in the room temperature is not affected by the outdoor temperature and the room temperature is lower than the outdoor temperature, and a third operation mode is selected when the change in the room temperature is not affected by the outdoor temperature and the room temperature is higher than the outdoor temperature.

Here, a criterion used for determining whether the change in the room temperature is affected by the outdoor temperature may be, for example, a criterion with which it may be determined that there is an influence of the outdoor temperature when the room temperature is higher than a threshold by comparing a median value (threshold) of room temperatures in the morning of a plurality of days for which the room temperature is not affected by the outdoor temperature with the room temperature at the time of inference (room temperature when the cooling period is calculated). Besides the median value, an average value or the like may also be adopted.

Figure 4:
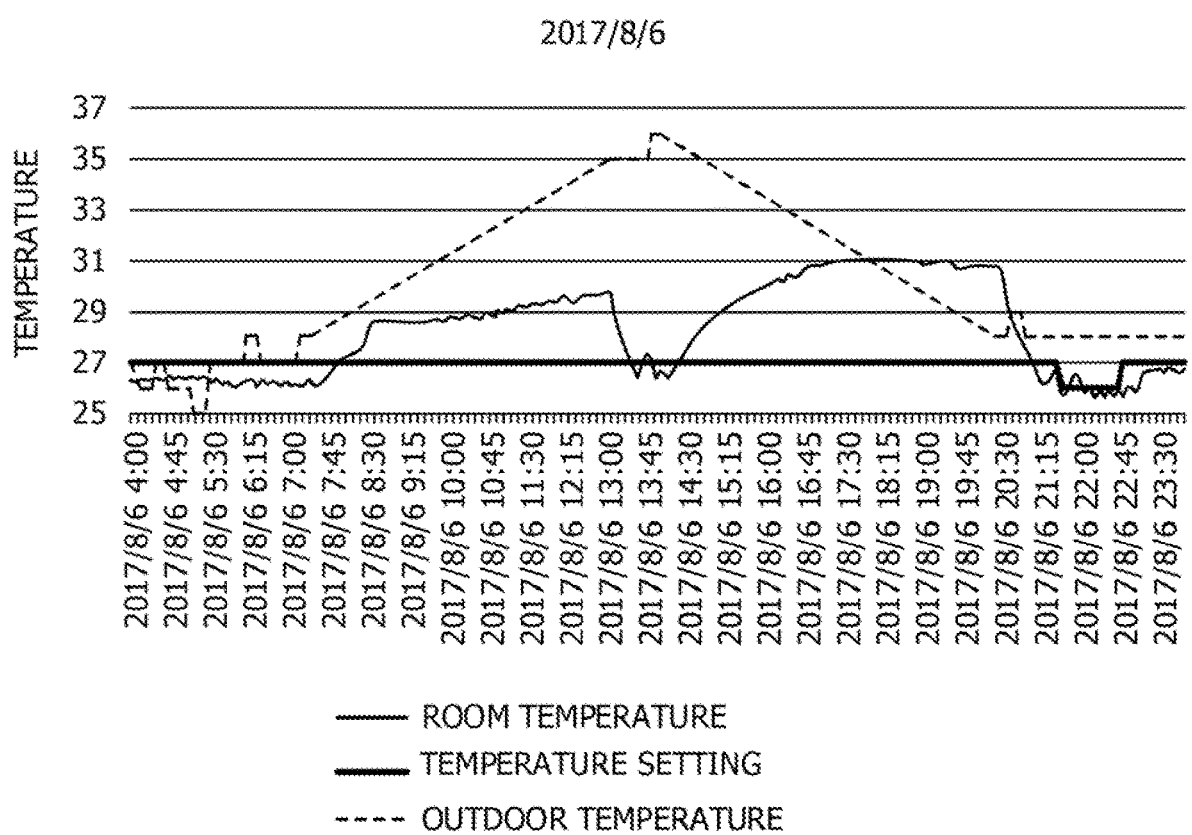
FIG. 4 is a diagram for describing an example of determining whether there is an influence of an outdoor temperature.

FIG. 4 is a diagram for describing an example of determining whether there is an influence of the outdoor temperature. Based on a history illustrated in FIG. 4, the criterion generation unit 23 determines the threshold to be 29° C. from the room temperatures in the morning of a plurality of days in the past and generates a determination criterion. For example, with the determination criterion, when the air-conditioning apparatus is turned on at about 21 o'clock (at the time of inference), the second operation mode is selected since the room temperature at the time is 31° C., which is higher than the threshold of 29° C.

The parameter calculation unit 24 is a processing unit that calculates cooling capacity information regarding the cooling capacity of the air-conditioning apparatus 2 and thermal insulation information regarding a thermal insulation state of the room 1 from the outside, based on the outdoor temperature, the room temperature, and the history information regarding the operation of the air-conditioning apparatus 2. For example, the parameter calculation unit 24 defines a physical model regarding a cooling period of the indoor space 1a in consideration of a heat exchange between the indoor space 1a and the outside, calculates various parameters in the physical model, and stores the various parameters in the parameter DB 15. For example, the parameter calculation unit 24 calculates the heat storage actor ($\sigma$) mentioned above.

Figure 5:
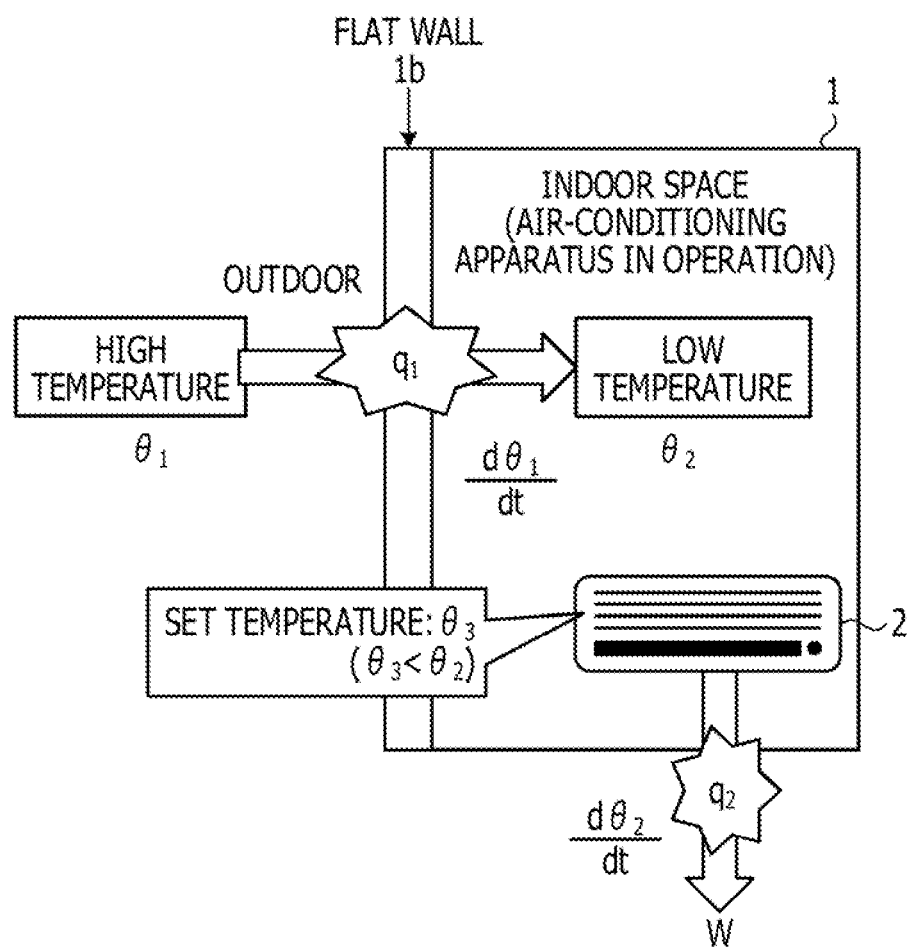
FIG. 5 is a diagram for describing a calculation of a heat storage factor.

FIG. 5 is a diagram for describing the calculation of the heat storage factor. As illustrated in FIG. 5, let $\theta_1$ denote a temperature of an outdoor space (outdoor temperature), $\theta_2$ denote a temperature of an indoor space, and $\theta_3$ denote a cooling temperature (set temperature) of the air-conditioning apparatus 2. It is assumed that $\theta_1 > \theta_2$ and $\theta_2 > \theta_3$ are satisfied. Note that the outdoor temperature $\theta_1$ does not change by the movement of heat. It is assumed that the temperature $\theta_2$ of the indoor space does not vary depending on the place. It is assumed that a heat quantity $q_2$ released per unit time by the air-conditioning operation does not depend on $\theta_2$ and is fixed. It is assumed that a heat outflow from the room 1 to the outside is not taken into consideration.

In such a state, a relational expression $q_1$ in which the outdoor temperature influences the room temperature may be defined by equation (1). In equation (1), $\alpha$ is a constant denoting thermal insulation performance. The heat quantity $q_2$ of the air-conditioning apparatus 2 may be defined by equation (2). In equation (2), W denotes the capacity of the air-conditioning apparatus 2 and is a constant determined based on the design document of the air-conditioning apparatus 2, a common heat transfer technology, or the like. A relational expression for cooling the room 1 may be defined by equation (3). In equation (3), $\beta$ is a constant calculated from the volume and a specific heat of air in the room 1.

$$q_1 = a(\theta_1 - \theta_2) \quad \text{equation (1)}$$

$$q_2 = W \quad \text{equation (2)}$$

$$\frac{d\theta_2}{dt} = \beta(q_1 - q_2) \quad \text{equation (3)}$$

The heat storage factor $\sigma(=\alpha\beta)$ is determined. For example, equation (4) is obtained by substituting equation (1) and equation (2) in equation (3). Equation (5) is then obtained by solving equation (4) using a constant coefficient linear differential equation of the first order. Equation (6) is then obtained by deriving a general solution for equation (5). When $\theta_0$ denotes the room temperature at time t=0, $\theta_0 = C$ is satisfied. Equation (7) is successfully obtained by substituting $\theta_0 = C$ in equation (6).

$$\frac{d\theta_2}{dt} = \beta(\alpha(\theta_1 - \theta_2) - W) = \alpha\beta\theta_1 - \alpha\beta\theta_2 - \beta W \quad \text{equation (4)}$$
$$= W' - \alpha\beta\theta_2$$

$$\frac{d\theta_2}{dt} + \sigma\theta_2 = W' \quad (\alpha\beta = \sigma)$$

$$\theta_2 = e^{-\sigma t}\left\{W' \int e^{\sigma t} dt + C\right\} \quad \text{equation (5)}$$

$$\theta_2 = e^{-\sigma t}\left\{W' \cdot \frac{1}{\sigma}[e^{\sigma t}]_0^t + C\right\}$$

$$= e^{-\sigma t}\left\{W' \cdot \frac{1}{\sigma}(e^{\sigma t} - 1) + C\right\}$$

$$\theta_2 = e^{-\sigma t}\left\{W' \cdot \frac{1}{\sigma}(e^{\sigma t} - 1) + C\right\} \quad \text{equation (6)}$$

$$= e^{-\sigma t}\left\{W' \cdot \frac{e^{\sigma t}}{\sigma} - W' \cdot \frac{1}{\sigma} + C\right\}$$

$$= W' \cdot \frac{e^0}{\sigma} - W' \cdot \frac{e^{-\sigma t}}{\sigma} + C \cdot e^{-\sigma t}$$

$$= W' \cdot \frac{1}{\sigma} - W' \cdot \frac{e^{-\sigma t}}{\sigma} + C \cdot e^{-\sigma t}$$

$$= \frac{W'}{\sigma}(1 - e^{-\sigma t}) + C \cdot e^{-\sigma t}$$

$$\theta_2 = \frac{W'}{\sigma}(1 - e^{-\sigma t}) + \theta_0 \cdot e^{-\sigma t} \quad \text{equation (7)}$$

On the other hand, a function of the outdoor temperature may be defined by equation (8). For example, the function of the outdoor temperature may be defined by using the heat storage factor ($\sigma$), the initial value ($\theta_1$) of the outdoor temperature, and the cooling capacity information ($\beta W$). When W=0, the air-conditioning apparatus 2 is stopped and $W' = \sigma\theta_1$. As indicated by equation (9), $\sigma$ is successfully defined by substituting $W' = \sigma\theta_1$ in equation (7) and expanding equation (7) to equation (9).

$$W' = \sigma\theta_1 - \beta W \quad \text{equation (8)}$$

$$\theta_2 = \theta_1(1 - e^{-\sigma t}) + \theta_0 \cdot e^{-\sigma t} \quad \text{equation (9)}$$

$$\theta_2 = e^{-\sigma t}(\theta_0 - \theta_1) + \theta_1$$

$$e^{-\sigma t} = \frac{\theta_2 - \theta_1}{\theta_0 - \theta_1}$$

$$\therefore \sigma = -\frac{\log\left(\frac{\theta_2 - \theta_1}{\theta_0 - \theta_1}\right)}{t}$$

Figure 6:
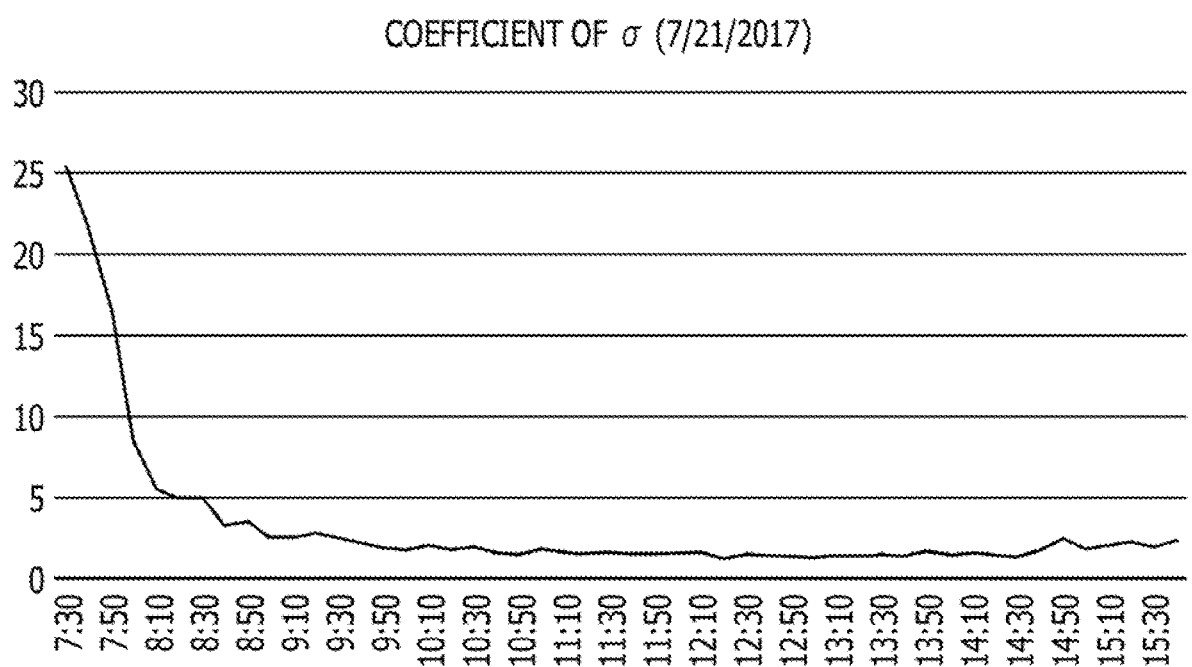
FIG. 6 is a diagram for describing the heat storage factor.

A change in the heat storage factor $\sigma$ to be calculated will be described. FIG. 6 is a diagram for describing the heat storage factor. As illustrated in FIG. 6, a coefficient of the heat storage factor $\sigma$ changes in a time period affected by the air-conditioning apparatus 2 on the previous day, whereas the change in the coefficient of the heat storage factor $\sigma$ is small in a time period not affected by the air-conditioning apparatus 2. Accordingly, the median value (for example, 1.47) of the time period not affected by the air-conditioning apparatus 2 is set as a. In this way, the heat storage factor $\sigma$ is successfully calculated when the air-conditioning apparatus 2 is stopped.

The cooling capacity ($\beta W$) per unit time of the air-conditioning apparatus 2 is calculated when the air-conditioning apparatus 2 is in operation. For example, a definition of the cooling capacity ($\beta W$) denoted by equation (10) is calculated by expanding equation (7). The cooling capacity ($\beta W$) is calculated by substituting the heat storage factor $\sigma$ in equation (10).

$$\theta_2 = \frac{W'}{\sigma}(1 - e^{-\sigma t}) + \theta_0 \cdot e^{-\sigma t} \quad \text{equation (10)}$$

$$\frac{W'}{\sigma}(1 - e^{-\sigma t}) = \theta_2 - \theta_0 \cdot e^{-\sigma t}$$

$$W' = \frac{\sigma(\theta_2 - \theta_0 \cdot e^{-\sigma t})}{1 - e^{-\sigma t}}$$

-continued $$\sigma\theta_1 - \beta W = \frac{\sigma(\theta_2 - \theta_0 \cdot e^{-\sigma t})}{1 - e^{-\sigma t}}$$

$$\beta W = \sigma\theta_1 - \frac{\sigma(\theta_2 - \theta_0 \cdot e^{-\sigma t})}{1 - e^{-\sigma t}}$$

Figure 7:
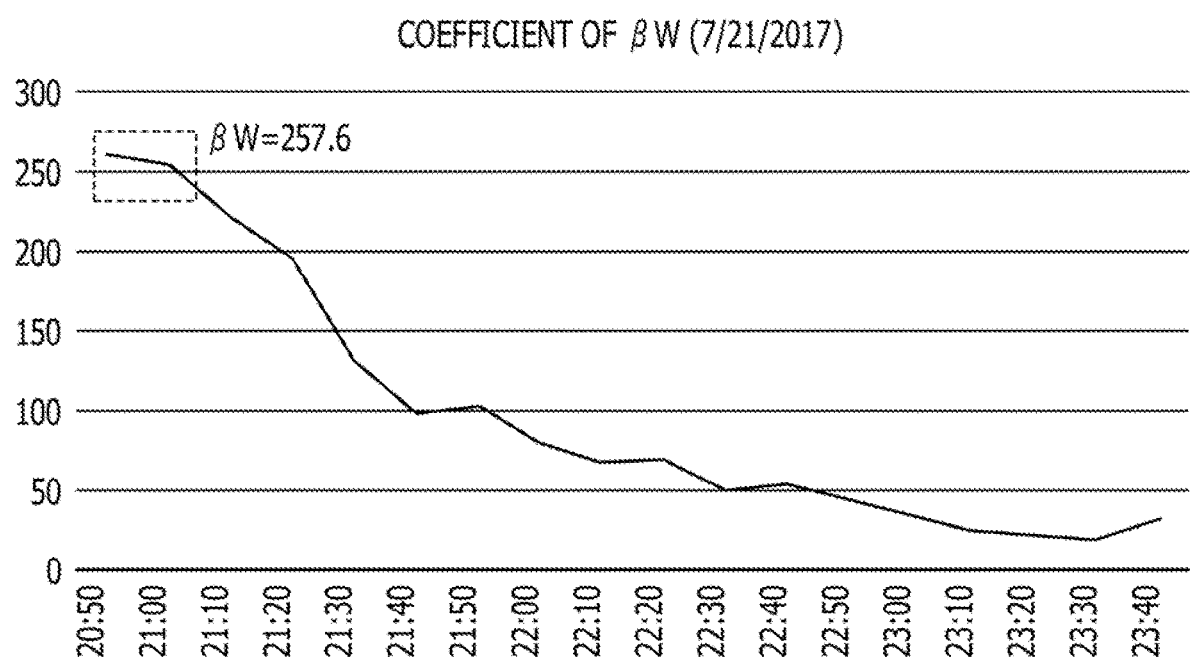
FIG. 7 is a diagram for describing a cooling capacity per unit time.

FIG. 7 is a diagram for describing the cooling capacity per unit time. As illustrated in FIG. 7, the cooling capacity ($\beta W$) indicates a full-power operation immediately after the operation is started and decreases as time passes. For example, the cooling capacity ($\beta W$) may be calculated to be "$\beta W=257.6$" by using a two-period moving average.

Referring back to FIG. 3, the pattern processing unit 25 includes a selection unit 25a and a calculation unit 25b. The pattern processing unit 25 is a processing unit that performs, when the air-conditioning apparatus 2 performs air conditioning, based on the outdoor temperature and the room temperature of a space, control for switching an operation mode between an operation mode (first operation mode) in which an operation is performed based on the cooling capacity information and operation modes (second and third operation modes) in which the operation is performed based on the cooling capacity information and the thermal insulation information.

The selection unit 25a is a processing unit that performs selection of the operation mode corresponding to the heat storage state at the current time point. For example, the selection unit 25a selects one of the first operation mode, the second operation mode, and the third operation mode in accordance with the determination criterion generated by the criterion generation unit 23. For example, when the indoor space is affected by the outdoor temperature, the selection unit 25a selects the first operation mode. When the indoor space is not affected by the outdoor temperature and when the room temperature is lower than the outdoor temperature, the selection unit 25a selects the second operation mode. When the indoor space is not affected by the outdoor temperature and when the room temperature is higher than the outdoor temperature, the selection unit 25a selects the third operation mode. The current room temperature refers to a room temperature at time when the calculation of the cooling period of pre-cooling is started or the like.

The calculation unit 25b is a processing unit that calculates a cooling period by using a calculation equation corresponding to the operation mode selected by the selection unit 25a. For example, when the first operation mode is selected, the calculation unit 25b uses equation (11) below.

Cooling period={(Room temperature−Target temperature)×β}/Cooling capacity per unit time     equation (11)

In equation (11), the "room temperature" may be obtained from the air-conditioning apparatus 2, the "target temperature" may be obtained from the setting information DB 14, and "$\beta$" is a constant defined by equation (3). The "cooling capacity per unit time" corresponds to "$\beta W$" denoted by equation (10) and is equal to, for example, 257.6 or the like.

The calculation unit 25b uses equation (12) below when the second operation mode is selected. The calculation unit 25b uses equation (13) below when the third operation mode is selected.

Cooling period=Equation (11)+(Heat dissipation from wall to indoor space+Influence ($\sigma$) of outdoor temperature)/Cooling capacity per unit time     equation (12)

Cooling period=Equation (11)+(Heat dissipation from wall to indoor space/Cooling capacity per unit time)     equation (13)

The "heat dissipation from wall to indoor space" in equations (12) and (13) corresponds to "$q_1$" defined by equation (1). The "influence ($\sigma$) of outdoor temperature" is the heat storage factor calculated using equation (9) and is equal to, for example, 1.47 or the like.

A relationship between each operation mode and the cooling period will be described. FIG. 8 is a diagram for describing the operation modes. As illustrated in FIG. 8, the first operation mode is selected in a time period a in which the flat wall 1b is capable of storing heat and thus the outdoor temperature does not affect the room temperature. The second operation mode is selected in a time period b in which no heat is stored in the flat wall 1b and the room temperature decreases because of the influence of the decrease in the outdoor temperature. The third operation mode is selected in a time period c in which the outdoor temperature decreases but the room temperature increases because of heat dissipation from the flat wall 1b to the indoor space 1a.

Cooling takes longer as the influence of heat dissipation from the outer wall (the flat wall 1b) to the indoor space increases. Therefore, the cooling period increases in an order of the first operation mode, the second operation mode, and the third operation mode. For example, a period taken for the room temperature to stabilize at the target temperature (set temperature) is the shortest in the first operation mode, and the period taken for the room temperature to stabilize at the target temperature (set temperature) is the longest in the third operation mode.

Referring back to FIG. 3, the air-conditioning control unit 26 is a processing unit that performs air-conditioning control to the target temperature by controlling torque or the like of the air-conditioning apparatus 2 in consideration of the cooling period calculated by the calculation unit 25b. For example, the air-conditioning control unit 26 calculates time (pre-cooling operation start time) that is the cooling period before the specified time, and starts cooling at the maximum output when the time is reached.

The air-conditioning control unit 26 may perform the air-conditioning control in two stages. For example, the air-conditioning control may be performed based on a first target temperature in a pre-cooling period by the presence start time (specified time) and on a second target temperature set after the presence of the user in the room starts. As for the second target temperature, an indoor temperature set by the user is set as the target temperature (for example, 27° C.). As for the first target temperature, for example, an indoor temperature of 28.5° C. is set as the indoor temperature at which the operation load of the air-conditioning apparatus 2 is smaller than that of the second target temperature and the comfort is not greatly deteriorated. The target temperature stored in the setting information DB 14 described above corresponds to the first target temperature (pre-cooling temperature).

Figure 9:
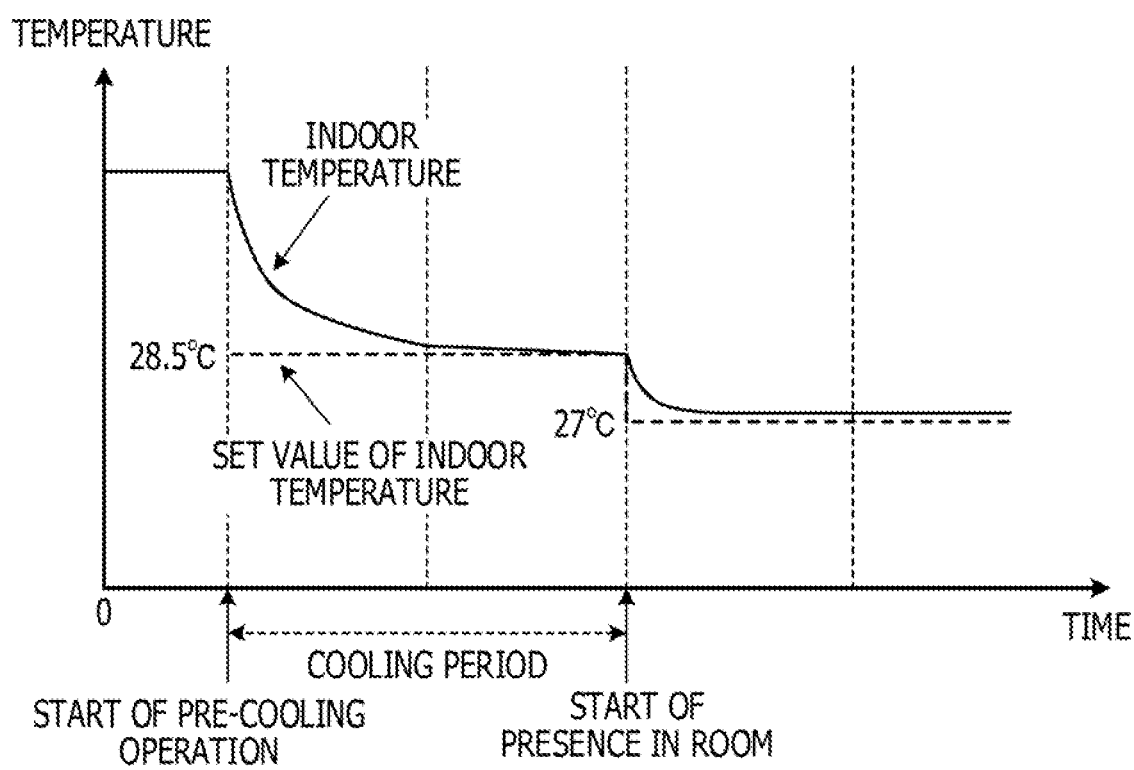
FIG. 9 is a diagram for describing air-conditioning control.

FIG. 9 is a diagram for describing the air-conditioning control. As illustrated in FIG. 9, the air-conditioning control unit 26 starts the pre-cooling operation at the time (pre-cooling operation start time) that is the cooling period before the specified time to perform pre-cooling so that the room temperature reaches the first target temperature (28.5° C.) at the specified time. After the specified time, the air-conditioning control unit 26 performs air-conditioning control such that the room temperature reaches the second target temperature (27° C.) set by the user.

Process Flow

A process performed by the control apparatus 10 described above will be described next. An overall process, a parameter acquisition process, and a selection process will be described herein.

(Overall Process)

Figure 10A:
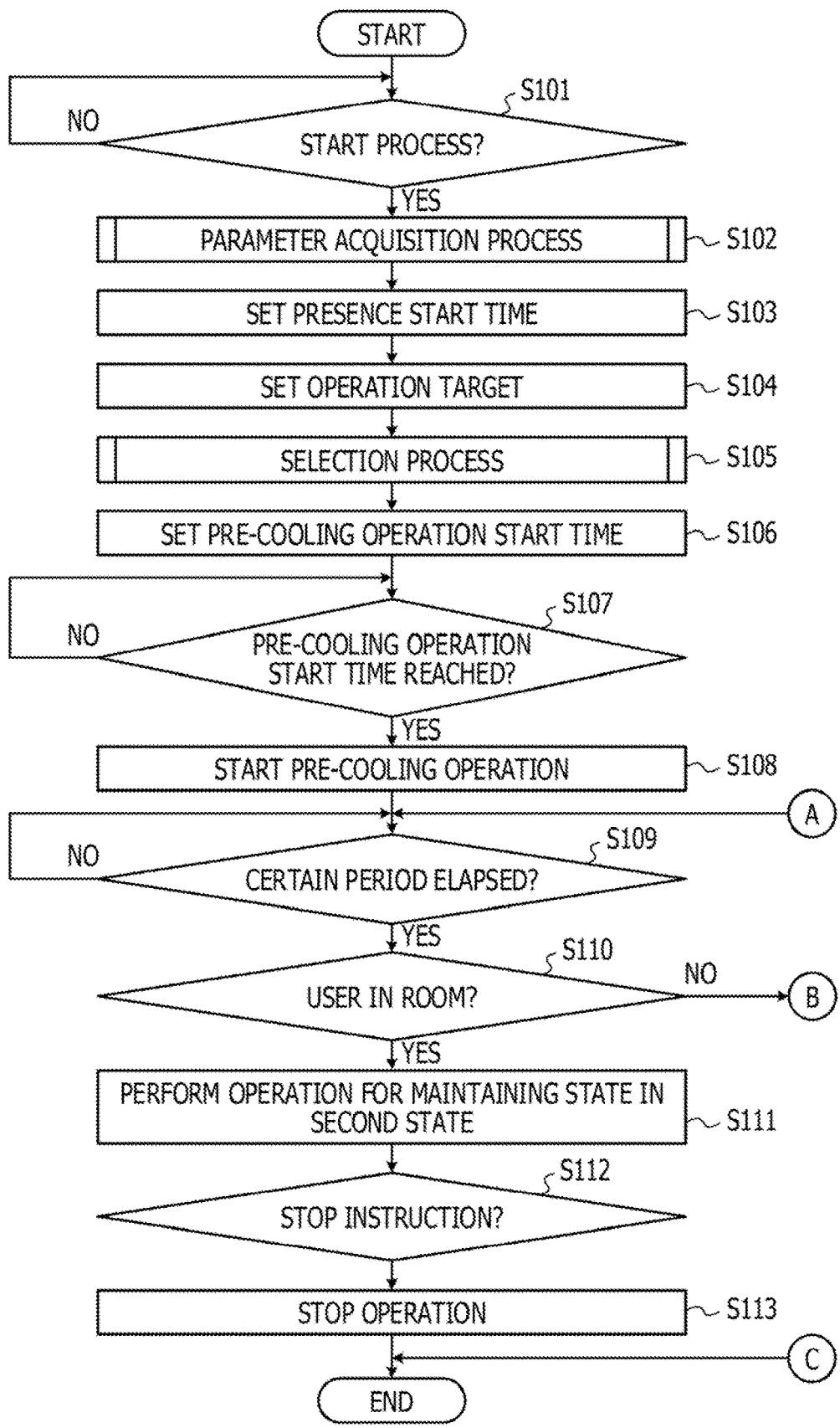
FIGS. 10A and 10B illustrate a flowchart illustrating a flow of an overall process.
Figure 10B:
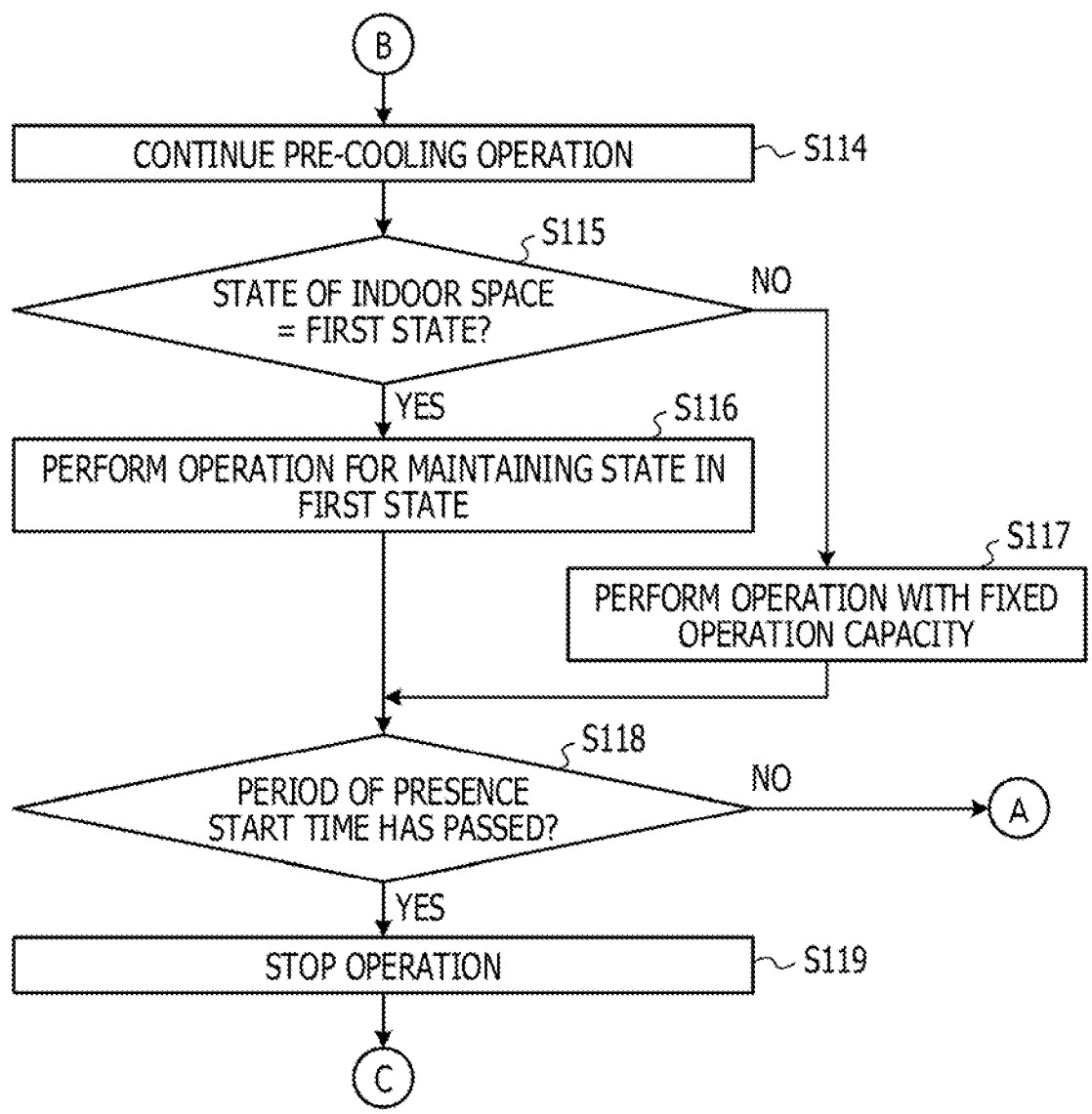

FIG. 10 (i.e., FIGS. 10A and 10B) is a flowchart illustrating a flow of the overall process. It is assumed that the determination criterion has been generated by the criterion generation unit 23. The timing at which the determination criterion is generated may be preferably before the selection process (S105) in FIG. 9, and generation of the determination criterion may be performed at a given timing.

As illustrated in FIG. 10, upon accepting an instruction to start a process (S101: Yes), the control apparatus 10 performs the parameter acquisition process (S102). The setting unit 22 of the control apparatus 10 then sets the presence start time of the user (specified time) based on the past history or a manual setting made by the user (S103). The setting unit 22 subsequently sets an operation target based on the past history or a manual setting made by the user (S104). The operation target is, for example, the first target temperature, the second target temperature, or the like.

The selection unit 25*a* of the control apparatus 10 then performs the selection process (S105). Thereafter, the calculation unit 25*b* sets the pre-cooling operation start time by using the result of the calculation of the cooling period (S106). When the pre-cooling operation start time is reached (S107: Yes), the air-conditioning control unit 26 starts the pre-cooling operation (S108).

Upon an elapse of a certain period thereafter (S109: Yes), the air-conditioning control unit 26 of the control apparatus 10 determines whether the user is in the room 1 by using the information acquired from the sensor 4 installed in the room 1 or the like (S110).

If the user is in the room (S110: Yes), the air-conditioning control unit 26 performs operation control to maintain the state in a second state (S111). For example, the air-conditioning control unit 26 instructs the air-conditioning apparatus 2 to perform cooling or the like such that the room temperature reaches the second target temperature. The air-conditioning apparatus 2 performs cooling or the like in accordance with the instruction from the air-conditioning control unit 26.

If the air-conditioning control unit 26 accepts a stop instruction from the user or the like thereafter (S112: Yes), the air-conditioning control unit 26 stops the operation of the air-conditioning apparatus 2 (S113). The air-conditioning apparatus 2 may directly accept the stop instruction from the user, or the air-conditioning control unit 26 may accept the stop instruction via the air-conditioning apparatus 2, a communication device, or the like.

On the other hand, if the user is not present in the room 1 in S110 (S110: No), the air-conditioning control unit 26 continues the pre-cooling operation (S114). Thereafter, the air-conditioning control unit 26 determines whether the state of the indoor space has become the first state (S115). For example, the air-conditioning control unit 26 acquires the room temperature or the like from the air-conditioning apparatus 2, and determines whether the room temperature has reached the first target temperature.

If the state of the indoor space has become the first state (S115: Yes), the air-conditioning control unit 26 performs operation control for maintaining the first state (S116). For example, the air-conditioning control unit 26 instructs the air-conditioning apparatus 2 to perform cooling or the like so as to maintain the room temperature at the first target temperature. The air-conditioning apparatus 2 performs cooling control or the like in accordance with the instruction from the air-conditioning control unit 26.

On the other hand, if the state of the indoor space has not become the first state (S115: No), the air-conditioning control unit 26 causes the air-conditioning apparatus 2 to operate at a fixed capacity until a period of the presence start time passes (S117).

If the presence of the user in the room is not detected and the period of the presence start time has not passed (S118: No), the control apparatus 10 repeats S109 and subsequent steps. If the control apparatus 10 determines that the period of the presence start time has passed without detection of the user's presence in the room (S118: Yes), the control apparatus 10 determines that the user will not be in the room thereafter, stops the operation of the air-conditioning apparatus 2, and ends the pre-cooling operation (S119).

(Parameter Acquisition Process)

Figure 11:
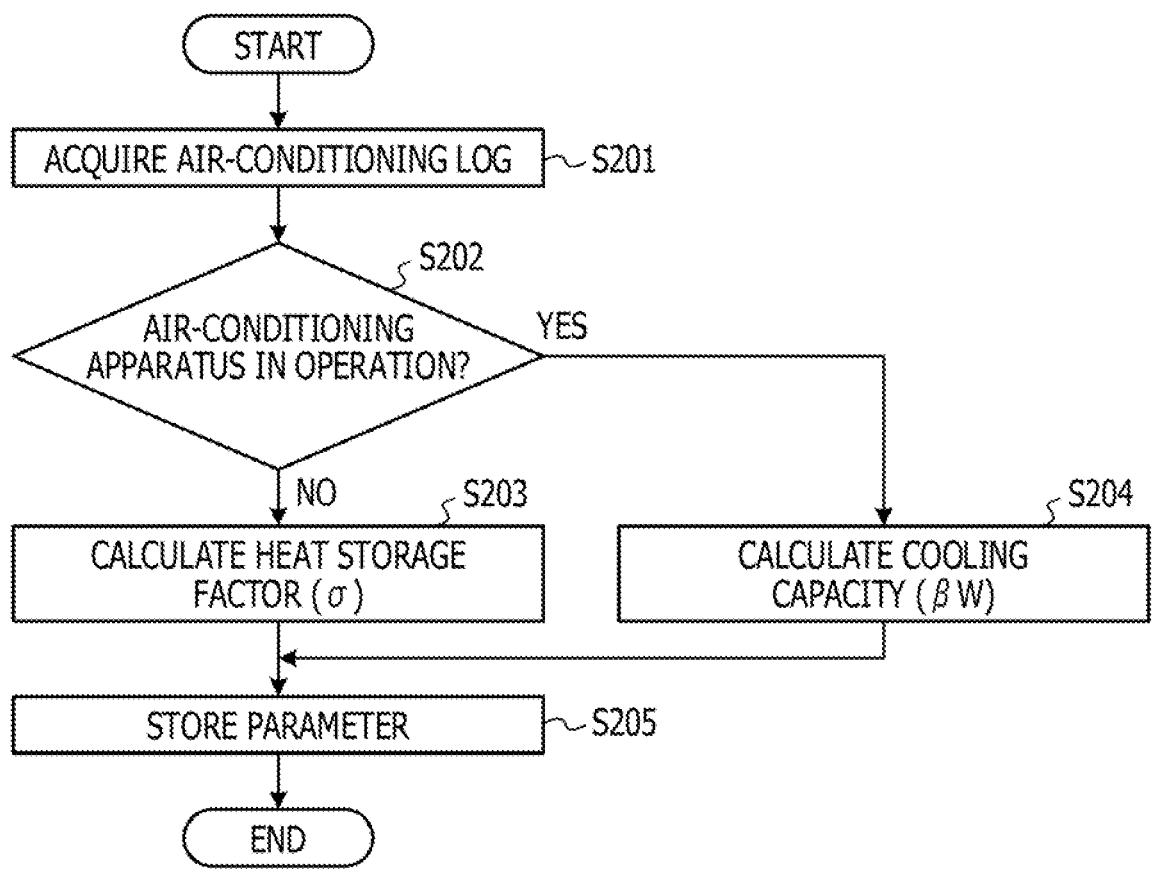
FIG. 11 is a flowchart illustrating a flow of a parameter acquisition process.

FIG. 11 is a flowchart illustrating a flow of the parameter acquisition process. This process is performed in S102 in FIG. 10. As illustrated in FIG. 11, the parameter calculation unit 24 of the control apparatus 10 acquires an air-conditioning log including an operation log of the air-conditioning apparatus 2, a room temperature history, and so on (S201) and determines whether the air-conditioning apparatus 2 is in operation (S202).

If the air-conditioning apparatus 2 is stopped (S202: No), the parameter calculation unit 24 calculates the heat storage factor ($\sigma$) (S203). If the air-conditioning apparatus 2 is in operation (S202: Yes), the parameter calculation unit 24 calculates the cooling capacity ($\beta W$) of the air-conditioning apparatus 2 (S204). The parameter calculation unit 24 then stores the calculated parameter in the parameter DB 15 (S205).

(Selection Process)

Figure 12:
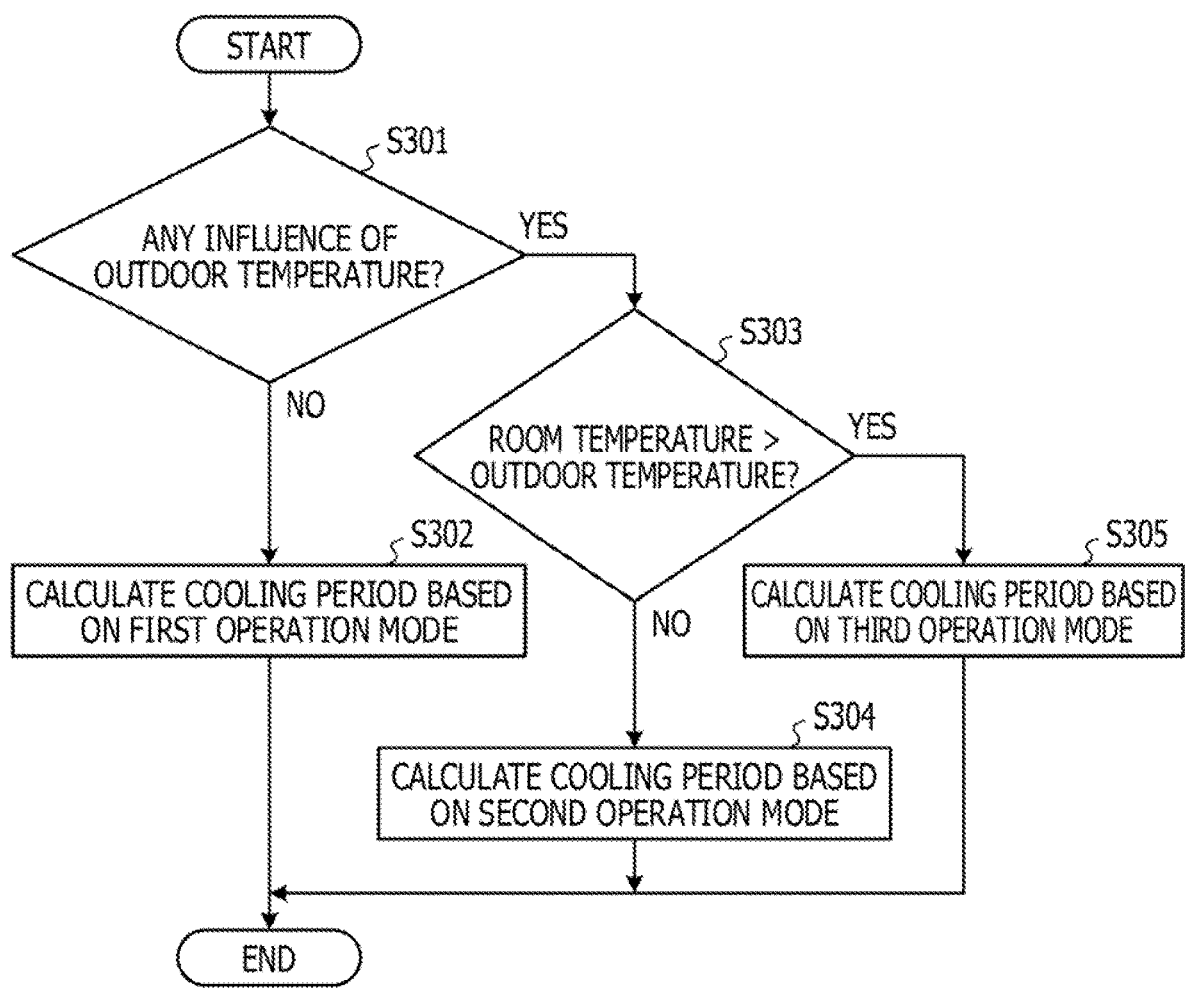
FIG. 12 is a flowchart illustrating a flow of a selection process.

FIG. 12 is a flowchart illustrating a flow of the selection process. This process is performed in S105 in FIG. 10. As illustrated in FIG. 11, the selection unit 25*a* of the control apparatus 10 determines whether the room temperature of the room 1 is affected by the outdoor temperature (S301).

If the room temperature of the room 1 is not affected by the outdoor temperature (S301: No), the selection unit 25*a* selects the first operation mode and the calculation unit 25*b* calculates the cooling period by using the calculation equation corresponding to the first operation mode (S302).

On the other hand, if the room temperature of the room 1 is affected by the outdoor temperature (S301: Yes), the selection unit 25*a* determines whether the current room temperature is higher than the outdoor temperature (S303).

If the current room temperature is lower than the outdoor temperature (S303: No), the selection unit 25*a* selects the second operation mode and the calculation unit 25*b* calculates the cooling period by using the calculation equation corresponding to the second operation mode (S304).

If the current room temperature is higher than the outdoor temperature (S303: Yes), the selection unit 25*a* selects the third operation mode and the calculation unit 25*b* calculates the cooling period by using the calculation equation corresponding to the third operation mode (S305).

As described above, the control apparatus 10 may automatically change the operation mode depending on whether temperature in the indoor space subjected to cooling is affected by the outdoor temperature. Since the control apparatus 10 determines the state of the space subjected to air-conditioning and performs the operation control corresponding to the determination result, it is possible to cause the room temperature to reach the target temperature at the set time without any waste. For example, the control apparatus 10 may perform operation control by distinguishing between a case where the influence of the outdoor temperature does not have to be taken into consideration owing to heat insulation and a case where the influence of the outdoor temperature is to be taken into consideration.

FIG. 13 is a diagram for describing advantages of one-stage air-conditioning control. FIG. 13 illustrates an example of air-conditioning control in the case where pre-cooling is performed in a state where the room temperature is affected by the outdoor temperature. As illustrated in FIG. 13, since the cooling period is set without taking into consideration heat dissipation from the outer wall to the indoor space in the common method, the effect of cooling performed by the air-conditioning apparatus 2 is decreased by the heat dissipation from the outer wall. Consequently, a situation occurs where the room temperature is not decreased to the target temperature by the time when the user starts to be in the room. In contrast, in the method according to the first embodiment, the cooling period is settable by taking into consideration the heat dissipation from the outer wall to the indoor space. Thus, the room temperature is successfully decreased to the target temperature by the time when the user starts to be in the room although the cooling period increases. For example, when pre-cooling is started in the nighttime, pre-cooling is started earlier than in the daytime because heat dissipation from the outer wall is to be taken into consideration. As described above, since the control apparatus 10 may accurately estimate the time up until the temperature stabilizes and may avoid a state where the temperature does not reach the target temperature, the control apparatus 10 may realize the improved comfort of the user.

FIG. 14 is a diagram for describing advantages of two-stage air-conditioning control. FIG. 14 illustrates an example of air-conditioning control in the case where pre-cooling is performed in a state where the room temperature is not affected by the outdoor temperature. As illustrated in FIG. 14, in the common method, the cooling period is set without taking into consideration heat dissipation from the outer wall to the indoor space. Thus, the effect of cooling performed by the air-conditioning apparatus 2 is too strong. Consequently, a situation occurs where the room temperature is decreased too low by the time when the user starts to be in the room 1 or the like. In contrast, in the method according to the first embodiment, the cooling period is settable by taking into consideration the fact that there is no heat dissipation from the outer wall to the indoor space. Thus, a shorter cooling period may be set and a situation where the room temperature is decreased too low may be avoided. For example, when pre-cooling is performed in the daytime, heat dissipation to the indoor space does not have to be taken into consideration in pre-cooling. Thus, the temperature reaches the target temperature by the specified time even if pre-cooling is started later than in the nighttime.

Second Embodiment

While the first embodiment of the present disclosure has been described above, the present disclosure may be carried out in various different embodiments other than the first embodiment described above.

Target Space

In the first embodiment described above, a room of a company or the like has been described as an example; however, the target space is not limited thereto. For example, various spaces such as the inside of a train, a car, or the like, a machine room, and the inside of a plane may be set as the target space.

Control Apparatus

In the first embodiment, the example has been described in which the control apparatus 10 and the air-conditioning apparatus 2 are realized as different apparatuses; however, the configuration is not limited thereto. For example, even if the air-conditioning apparatus 2 is an apparatus including the control apparatus 10, the air-conditioning apparatus 2 may perform processing in substantially the same manner. The control apparatus 10 may include the above-described various sensors such as the sensor 4, The specific method of the air-conditioning control is an example, and various known methods may be adopted.

Cloud

Figure 15:
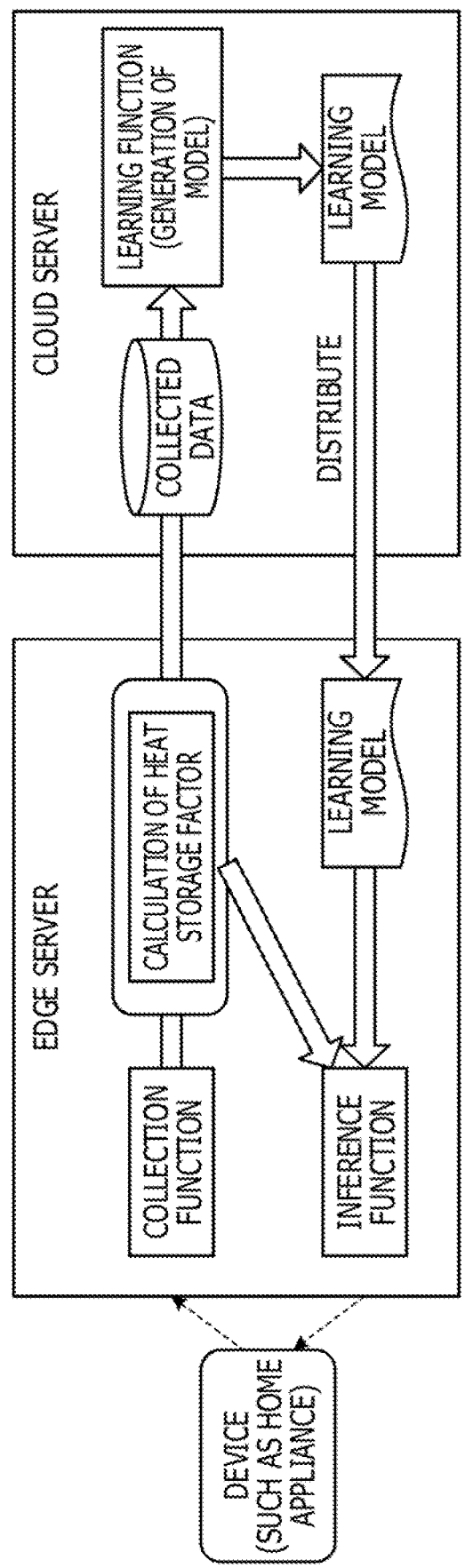
FIG. 15 is a diagram for describing cooperation with the cloud.

The air-conditioning control described above may be realized by using a cloud system. FIG. 15 is a diagram for describing cooperation with the cloud. As illustrated in FIG. 15, an edge server installed in a space or the like subjected to air-conditioning control and a cloud server may be configured to cooperate with each other. The edge server collects various kinds of information from devices such as the air-conditioning apparatus 2 and the outdoor unit 3, calculates the heat storage factor described above, and transmits the heat storage factor to the cloud server. The cloud server generates a learning model for predicting a room temperature by using the heat storage factor and the various kinds of collected information acquired from the edge server and transmits the learning model to the edge server. The edge server then predicts a change in the room temperature or the like by using the learning model acquired from the cloud server and performs air-conditioning control such as pre-cooling.

In this way, distributed processing may be realized, and a reduction in the operation rate or the data area of the processor of the cloud server may be realized. The air-conditioning control may be performed in real time by estimating the heat storage factor at the edge server. The control apparatus 10 described above may cause a microcomputer or the like included in a remote control of the air-conditioning apparatus 2 to download data of an operation plan and cause the remote control to perform automatic control according to the operation plan.

Operation Modes

In the first embodiment, the example has been described in which one of the three operation modes is selected; however, the configuration is not limited thereto. For example, the operation mode may be selected from among two operation modes (the first operation mode and the second operation mode) depending on whether the room temperature is affected by the outdoor temperature. In the first embodiment, the example has been described in which the air-conditioning control is performed in two stages; however, the configuration is not limited thereto. One-stage control for performing air-conditioning control such that the room temperature reaches the target temperature by the presence start time may be adopted. The cooling period may be statically set without using the calculation equation corresponding to each mode such that the cooling period in the first operation mode is 10 minutes, the cooling period in the second operation mode is 15 minutes, and the cooling period in the third operation mode is 20 minutes.

Application to Heating

In the first embodiment, cooling (pre-cooling) has been described as an example; however, heating (pre-heating) may also be performed in the similar manner. In the case of heating, a situation opposite to that of cooling occurs because of heat dissipation from the outer wall having accumulated the heat to the indoor space. For example, in a time period (c in FIG. 8) in which there is heat dissipation from the outer wall to the indoor space, heating progresses by the heat dissipation in addition to heating by the air-conditioning apparatus. Thus, a pre-heating period decreases unlike the pre-cooling period. In a time period (b in FIG. 8) in which heat dissipation from the outer wall to the indoor space is small and the outdoor temperature is lower than the room temperature, the influence of heating is small and consequently the pre-heating period increases. As described above, the operation mode may be selected for heating from substantially the same viewpoint as that of the first embodiment and a heating period may be calculated. For example, $\theta_1$ and $\theta_2$ of equation (1) respectively denote the room temperature and the outdoor temperature so that $\theta_2 > \theta_1$ is satisfied at the time of heating.

System

The processing procedures, the control procedures, the specific names, and the information including the various kinds of data and parameters cited in the specification and drawings described above may be arbitrarily changed unless otherwise specified. The specific examples, distributions, numerical values, and so on described in the embodiments are merely examples and may be arbitrarily changed.

In addition, the elements of each of the apparatuses and devices illustrated in the drawings are functionally conceptual and do not necessarily have to be physically configured as illustrated. For example, the specific configuration regarding the dispersion and integration of the apparatuses and devices is not limited to the illustrated one. For example, all or some of the apparatuses and devices may be configured to be distributed or integrated functionally or physically in given units depending on various loads and usage conditions. In addition, all or given some of processing functions performed by the apparatuses and devices may be implemented by a CPU and a program to be analyzed and executed by the CPU, or may be implemented as hardware by wired logic.

Hardware

Figure 16:
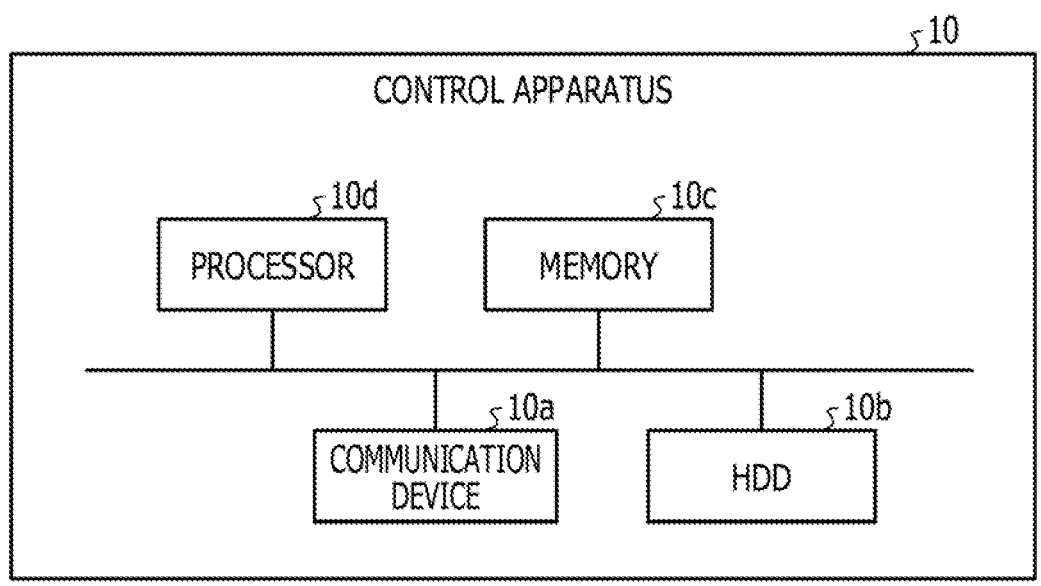
FIG. 16 is a diagram for describing an example of a hardware configuration.

FIG. 16 is a diagram for describing an example of a hardware configuration. As illustrated in FIG. 16, the control apparatus 10 includes a communication device 10a, a hard disk drive (HDD) 10b, a memory 10c, and a processor 10d. The communication device 10a, the HDD 10b, the memory 10c, and the processor 10d illustrated in FIG. 16 are coupled to one another by a bus or the like.

The communication device 10a is a network interface card or the like and performs communication with another server. The HDD 10b stores a program for causing the functional units illustrated in FIG. 3 to operate and stores the DBs illustrated in FIG. 3.

The processor 10d reads, from the HDD 10b or the like, a program for causing the substantially the same processes as those of the processing units illustrated in FIG. 3 to be performed and loads the program to the memory 10c to run a process of performing the functions described with reference to FIG. 3 and so on. For example, this process performs a function that is substantially the same as that of each of the processing units included in the control apparatus 10. For example, the processor 10d reads, from the HDD 10b or the like, a program having functions that are substantially the same as those of the acquisition unit 21, the setting unit 22, the criterion generation unit 23, the parameter calculation unit 24, the pattern processing unit 25, the air-conditioning control unit 26, and so on. The processor 10d runs a process of performing processing that is substantially the same as the processing of the acquisition unit 21, the setting unit 22, the criterion generation unit 23, the parameter calculation unit 24, the pattern processing unit 25, the air-conditioning control unit 26, and so on.

As described above, the control apparatus 10 operates as an information processing apparatus that carries out a control method by reading and executing a program. The control apparatus 10 may implement functions that are substantially the same as those of the embodiments described above by reading the program from a recording medium with a medium reading apparatus and by executing the read program. The program described in other embodiments is not limited to a program that is executed by the control apparatus 10. For example, the present disclosure may also be applied to cases where another computer or a server executes the program and where another computer and a server execute the program in cooperation with each other.

The program may be distributed via a network such as the Internet. The program may recorded on a computer-readable recording medium such as a hard disk, a flexible disk (FD), a compact disc read-only memory (CD-ROM), a magneto-optical disk (MO), a digital versatile disc (DVD), or the like, and may be executed after being read from the recording medium by a computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control method performed by a computer, the method comprising:

storing history information regarding an operation of an air-conditioning apparatus, the air-conditioning apparatus being configured to perform air-conditioning control of an air flow provided to a space isolated at least in part from an outside space by a wall, the history information indicating one or more of temperatures measured in the space in morning time of days by the air-conditioning apparatus;

executing a generation process that includes generating criterion information by using the one or more of temperatures measured in the morning time of days indicated in the history information, the criterion information indicating threshold to be used for switching an operation mode of the air-conditioning apparatus between a first operation mode and a second operation mode, the first operation mode being a mode causing the air-conditioning apparatus to operate by a control scheme configured to determine an operation timing of the air-conditioning apparatus without taking an influence of an outdoor temperature into consideration, the second operation mode being a mode causing the air-conditioning apparatus to operate by a control scheme configured to determine an operation timing of the air-conditioning apparatus with taking the influence of the outdoor temperature into consideration; and executing a control process in response to the generated criterion information, the control process including:

causing the air-conditioning apparatus to measure a temperature in the space;

comparing the temperature measured in the space with the threshold indicated in the criterion information;

in response to a comparison result indicating that the temperature measured in the space is equal to or less than the threshold, cause the air-conditioning apparatus to operate in the first operation mode, wherein a first operation start time when the air-conditioning apparatus in the first operation mode is required to start performing the air-conditioning control in order to adjust the temperature of the space to a specified temperature by a specified time is calculated without taking an influence of the outdoor temperature into consideration; and in response to a comparison result indicating that the temperature measured in the space is greater than the threshold, cause the air-conditioning apparatus to operate in the second operation mode, wherein a second operation start time when the air-conditioning apparatus in the second operation mode is required to start performing the air-conditioning control in order to adjust the temperature of the space to the specified temperature by the specified time is calculated with taking an influence of the outdoor temperature into consideration, thereby the second operation start time is determined such that a time period from the second operation start time to the specified time is longer than a time period from the first operation start time to the specified time.

2. The control method according to claim 1,
wherein the generation process is configured to
compare a first median value with a first room temperature, the first median value being a median value of room temperatures obtained in the morning in the past, the first room temperature being a room temperature at time when the air-conditioning control is started,
select the first operation mode when the first room temperature is lower than the first median value, and
select the second operation mode when the first room temperature is higher than the first median value.

3. The control method according to claim 2,
wherein the generation process is configured to, when the second operation mode is selected, select a first air-conditioning control mode or a second air-conditioning control mode based a relationship between the first room temperature and the outdoor temperature, and
wherein an air-conditioning control period in the first air-conditioning control mode is different from an air-conditioning control period in the second air-conditioning control mode.

4. The control method according to claim 1,
wherein the criterion information is so configured that
when cooling is performed in the space, a cooling period in the first operation mode is shorter than a cooling period in the second operation mode, and
when heating is performed in the space, a heating period in the first operation mode is longer than a heating period in the second operation mode.

5. A control apparatus comprising:
a memory configured to store history information regarding an operation of an air-conditioning apparatus, the air-conditioning apparatus being configured to perform air-conditioning control of an air flow provided to a space isolated at least in part from an outside space by a wall, the history information indicating one or more of temperatures measured in the space in morning time of days by the air-conditioning apparatus; and
a processor coupled to the memory, the processor being configured to:
execute a generation process that includes generating criterion information by using the one or more of temperatures measured in the morning time of days indicated in the history information, the criterion information indicating threshold to be used for switching an operation mode of the air-conditioning apparatus between a first operation mode and a second operation mode, the first operation mode being a mode causing the air-conditioning apparatus to operate by a control scheme configured to determine an operation timing of the air-conditioning apparatus without taking an influence of an outdoor temperature into consideration, the second operation mode being a mode causing the air-conditioning apparatus to operate by a control scheme configured to determine an operation timing of the air-conditioning apparatus with taking the influence of the outdoor temperature into consideration; and,
execute a control process in response to the generated criterion information, the control process including:
causing the air-conditioning apparatus to measure a temperature in the space;
comparing the temperature measured in the space with the threshold indicated in the criterion information;
in response to a comparison result indicating that the temperature measured in the space is equal to or less than the threshold, cause the air-conditioning apparatus to operate in the first operation mode, wherein a first operation start time when the air-conditioning apparatus in the first operation mode is required to start performing the air-conditioning control in order to adjust the temperature of the space to a specified temperature by a specified time is calculated without taking an influence of the outdoor temperature into consideration; and
in response to a comparison result indicating that the temperature measured in the space is greater than the threshold, cause the air-conditioning apparatus to operate in the second operation mode, wherein a second operation start time when the air-conditioning apparatus in the second operation mode is required to start performing the air-conditioning control in order to adjust the temperature of the space to the specified temperature by the specified time is calculated with taking an influence of the outdoor temperature into consideration, thereby the second operation start time is determined such that a time period from the second operation start time to the specified time is longer than a time period from the first operation start time to the specified time.

6. The control apparatus according to claim 5,
wherein the generation process is configured to
compare a first median value with a first room temperature, the first median value being a median value of room temperatures obtained in the morning in the past, the first room temperature being a room temperature at time when the air-conditioning control is started,
select the first operation mode when the first room temperature is lower than the first median value, and
select the second operation mode when the first room temperature is higher than the first median value.

7. The control apparatus according to claim 6,
wherein the generation process is configured to, when the second operation mode is selected, select a first air-conditioning control mode or a second air-conditioning control mode based a relationship between the first room temperature and the outdoor temperature, and
wherein an air-conditioning control period in the first air-conditioning control mode is different from an air-conditioning control period in the second air-conditioning control mode.

8. The control apparatus according to claim 6,
wherein the criterion information is so configured that
when cooling is performed in the space, a cooling period in the first operation mode is shorter than a cooling period in the second operation mode, and
when heating is performed in the space, a heating period in the first operation mode is longer than a heating period in the second operation mode.

9. A non-transitory computer-readable storage medium for storing a program which causes a processor to perform processing, the processing comprising:
storing history information regarding an operation of an air-conditioning apparatus, the air-conditioning apparatus being configured to perform air-conditioning control of an air flow provided to a space isolated at least in part from an outside space by a wall, the history information indicating one or more of temperatures measured in the space in morning time of days by the air-conditioning apparatus;
executing a generation process that includes generating criterion information by using the one or more of temperatures measured in the morning time of days indicated in the history information, the criterion information indicating threshold to be used for switching an operation mode of the air-conditioning apparatus between a first operation mode and a second operation mode, the first operation mode being a mode causing the air-conditioning apparatus to operate by a control scheme configured to determine an operation timing of the air-conditioning apparatus without taking an influence of an outdoor temperature into consideration, the second operation mode being a mode causing the air-conditioning apparatus to operate by a control scheme configured to determine an operation timing of the air-conditioning apparatus with taking the influence of the outdoor temperature into consideration; and
executing a control process in response to the generated criterion information, the control process including:

causing the air-conditioning apparatus to measure a temperature in the space;
comparing the temperature measured in the space with the threshold indicated in the criterion information;
in response to a comparison result indicating that the temperature measured in the space is equal to or less than the threshold, cause the air-conditioning apparatus to operate in the first operation mode, wherein a first operation start time when the air-conditioning apparatus in the first operation mode is required to start performing the air-conditioning control in order to adjust the temperature of the space to a specified temperature by a specified time is calculated without taking an influence of the outdoor temperature into consideration; and
in response to a comparison result indicating that the temperature measured in the space is greater than the threshold, cause the air-conditioning apparatus to operate in the second operation mode, wherein a second operation start time when the air-conditioning apparatus in the second operation mode is required to start performing the air-conditioning control in order to adjust the temperature of the space to the specified temperature by the specified time is calculated with taking an influence of the outdoor temperature into consideration, thereby the second operation start time is determined such that a time period from the second operation start time to the specified time is longer than a time period from the first operation start time to the specified time.

10. The non-transitory computer-readable storage medium according to claim 9,
wherein the generation process is configured to
compare a first median value with a first room temperature, the first median value being a median value of room temperatures obtained in the morning in the past, the first room temperature being a room temperature at time when the air-conditioning control is started,
select the first operation mode when the first room temperature is lower than the first median value, and
select the second operation mode when the first room temperature is higher than the first median value.

11. The non-transitory computer-readable storage medium according to claim 10,
wherein the generation process is configured to, when the second operation mode is selected, select a first air-conditioning control mode or a second air-conditioning control mode based a relationship between the first room temperature and the outdoor temperature, and
wherein an air-conditioning control period in the first air-conditioning control mode is different from an air-conditioning control period in the second air-conditioning control mode.

12. The non-transitory computer-readable storage medium according to claim 9,
wherein the criterion information is so configured that
when cooling is performed in the space, a cooling period in the first operation mode is shorter than a cooling period in the second operation mode, and
when heating is performed in the space, a heating period in the first operation mode is longer than a heating period in the second operation mode.

* * * * *